(12) United States Patent
Zhou et al.

(10) Patent No.: US 8,509,332 B2
(45) Date of Patent: Aug. 13, 2013

(54) METHOD FOR GENERATING CODEBOOK, METHOD AND APPARATUS FOR DATA TRANSMISSION

(75) Inventors: Yongxing Zhou, Beijing (CN); Weijun Sun, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/330,390

(22) Filed: Dec. 19, 2011

(65) Prior Publication Data

US 2012/0087422 A1    Apr. 12, 2012

Related U.S. Application Data

(63) Continuation of application No. PCT/CN2010/074033, filed on Jun. 18, 2010.

(30) Foreign Application Priority Data

Jun. 18, 2009   (CN) .......................... 2009 1 0139469

(51) Int. Cl.
*H04K 1/10* (2006.01)
*H04L 27/28* (2006.01)

(52) U.S. Cl.
USPC .......................................... 375/260; 375/295

(58) Field of Classification Search
USPC ................... 375/260, 267, 295, 299
See application file for complete search history.

(56) References Cited

U.S. PATENT DOCUMENTS

| | | | |
|---|---|---|---|
| 7,649,831 B2 * | 1/2010 | Van Rensburg et al. | 370/203 |
| 7,778,826 B2 | 8/2010 | Lin et al. | |
| 2007/0098106 A1 * | 5/2007 | Khojastepour et al. | 375/267 |
| 2008/0037669 A1 | 2/2008 | Pan et al. | |
| 2008/0192852 A1 | 8/2008 | Kent et al. | |

(Continued)

FOREIGN PATENT DOCUMENTS

| | | |
|---|---|---|
| CN | 101056162 A | 10/2007 |
| CN | 101138168 A | 3/2008 |

(Continued)

OTHER PUBLICATIONS

International search report for International application No. PCT/CN2010/074033, dated Sep. 23, 2010, total 4 pages.

(Continued)

*Primary Examiner* — Sam K Ahn
*Assistant Examiner* — Freshteh N Aghdam

(57) ABSTRACT

A method for generating a codebook and a method and an apparatus for data transmission are provided. The method includes: receiving a label of a codeword sent by a User Equipment (UE); selecting the codeword identified by the label from the codebook for eight-antenna; and coding data to be sent by using the codeword. The codebook for eight-antenna includes at least one rank-8 codeword for eight-antenna. The rank-8 codeword for eight-antenna is generated by multiplying an inverse matrix of a rotation matrix for eight-antenna with an eight-dimensional matrix formed by rank-4 codewords for four-antenna; or generated by extending rank-4 codewords for eight-antenna, where the rank-4 codeword for eight-antenna is generated according to codewords for four-antenna. Therefore, the codeword in the codebook for eight-antenna is applicable to scenarios including dual-polarization strong correlation, dual-polarization weak correlation, single-polarization strong correlation, and single-polarization weak correlation, etc.

12 Claims, 7 Drawing Sheets

(56) References Cited

U.S. PATENT DOCUMENTS

| | | | |
|---|---|---|---|
| 2008/0192856 A1* | 8/2008 | Jongren et al. | 375/267 |
| 2008/0227495 A1 | 9/2008 | Kotecha et al. | |
| 2008/0232501 A1 | 9/2008 | Khojastepour et al. | |
| 2008/0292013 A1* | 11/2008 | Varadarajan et al. | 375/260 |
| 2009/0125781 A1 | 5/2009 | Jeong et al. | |
| 2010/0172430 A1* | 7/2010 | Melzer et al. | 375/267 |
| 2010/0278130 A1 | 11/2010 | Sambhwani et al. | |
| 2010/0284484 A1* | 11/2010 | Jongren et al. | 375/267 |
| 2011/0096851 A1* | 4/2011 | Clerckx et al. | 375/259 |

FOREIGN PATENT DOCUMENTS

| | | |
|---|---|---|
| CN | 101330479 A | 12/2008 |
| CN | 101335558 A | 12/2008 |
| JP | 2012525798 A | 10/2012 |
| WO | 2005034544 A1 | 4/2005 |
| WO | 2008113455 A1 | 9/2008 |

OTHER PUBLICATIONS

Written Opinion of the International Search Authority for International application No. PCT/CN2010/074033, dated Sep. 23, 2010, total 2 pages.

Search report of corresponding European Patent Application No. 10788950.3, mailed on May 24, 2012, 7 pages total.

3GPP TSG RAN WG1#57 R1-091819, "DL MIMO codebook for 8 antenna ports," Huawei, San Francisco, dated May 4-8, 2009, 8 pages total.

3GPP TSG RAN WG1#56 R1-090977, "Precoding options for 8Tx antennas in LTE-A DL," Marvell Semiconductor, Athens, Greece, dated Feb. 9-13, 2009, 6 pages total.

3GPP TSG RAN WG1#49 R1-070244, "Simulation results for DL SU-MIMO Schemes for cross-polarised Antennnas," Alcatel-Lucent, Kobe, Japan, dated May 7-11, 2007, 12 pages total.

The front page of Chinese issued patent CN 101931507, Sep. 5, 2012, 1 page only.

Written opinion of corresponding PCT Patent Application No. PCT/CN2010/074033, mailed on Sep. 23, 2010, 4 pages total.

Office action issued in corresponding Russian application No. 2011152624/07, dated Feb. 20, 2013, and an English translation thereof, total 10 pages.

Office action issued in corresponding Korean application No. 10-2011-7031214, dated Feb. 20, 2013, and an English translation thereof, total 13 pages.

Office action issued in corresponding European application No. 10788950.3, dated Apr. 18, 2013, total 7 pages.

Office action issued in corresponding Japanese application No. 2012515345, dated May 7, 2013, and an English translation thereof, total 9 pages.

* cited by examiner

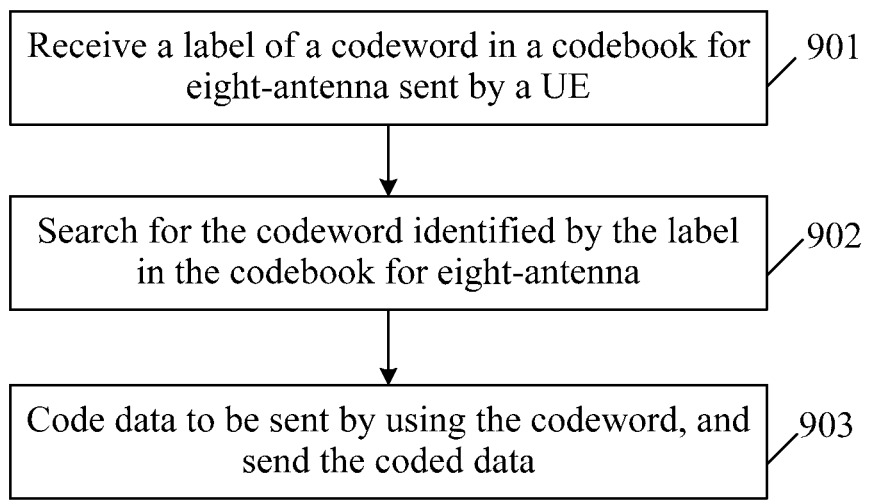

METHOD FOR GENERATING CODEBOOK, METHOD AND APPARATUS FOR DATA TRANSMISSION

CROSS-REFERENCE TO RELATED APPLICATION

This application is a continuation application of International Patent Application No. PCT/CN2010/074033, filed on Jun. 18, 2010, which claims priority to Chinese Patent Application No. 200910139469.2, filed on Jun. 18, 2009, both of which are hereby incorporated by reference in their entireties.

FIELD OF THE INVENTION

The present invention relates to the field of communication technologies, and in particular, to a method for generating a codebook, and a method and an apparatus for data transmission.

BACKGROUND OF THE INVENTION

In order to satisfy the demand of peak spectrum efficiency, support for eight antennas at a base station side is added during formulation of a Long Term Evolution Advanced (LTE-A) standard for a new generation of wireless cellular mobile communication system.

A codebook for eight-antenna is designed by using a codebook for two-antenna and a codebook for four-antenna to produce a Kronecker product, and use the codebook for four-antenna and the codebook for two-antenna to produce a Kronecker product, so as to generate a full rank codebook $CB_8^{(8)}$ for eight-antenna, which is specifically shown in Formula (1):

$$CB_8^{(8)} \subseteq MCB_8^{(8)} = \qquad (1)$$
$$\{W^{(2)} \otimes W^{(4)} \mid W^{(n)} \in CB_n^{(n)}\} \cup \{W^{(4)} \otimes W^{(2)} \mid W^{(n)} \in CB_n^{(n)}\}$$

$$\text{where } w^{(2)} \in CB_2^{(2)} = \left\{ \frac{1}{\sqrt{2}} \begin{bmatrix} 1 & 1 \\ 1 & -1 \end{bmatrix}, \frac{1}{\sqrt{2}} \begin{bmatrix} 1 & 1 \\ j & -j \end{bmatrix} \right\},$$

n is equal to 2 or 4, $W^{(2)}$ is a codeword in the codebook for two-antenna, $W^{(4)}$ is a codeword in the codebook for four-antenna, $CB_2^{(2)}$ is a full rank codebook for two-antenna, and $CB_4^{(4)}$ is a full rank codebook for four-antenna. The codeword for eight-antenna does not adapt to characteristics of a dual-polarization channel, and cannot be effectively applied to a dual-polarization antenna.

SUMMARY OF THE INVENTION

The present invention is directed to a method for generating a codebook, and a method and an apparatus for data transmission, which are applicable to scenarios including dual-polarization strong correlation, dual-polarization weak correlation, single-polarization strong correlation, and single-polarization weak correlation.

Accordingly, embodiments of the present invention provide:

According to one aspect, a method for generating a codebook is provided, including:
 obtaining a rotation matrix $U_{rot}^{(8)}$ for eight-antenna;
 obtaining rank-4 codewords for four-antenna; and
 obtaining a rank-8 codeword for eight-antenna by multiplying an inverse matrix of the rotation matrix with an eight-dimensional matrix formed by the rank-4 codewords for four-antenna, where the rank-8 codeword for eight-antenna is used by a base station for coding data to be sent.

According to the other aspect, a method for generating a codebook is provided, which includes:
 obtaining codewords for four-antenna; and
 obtaining a rank-1 codeword for eight-antenna or a rank-4 codeword for eight-antenna by using the codewords for four-antenna.

According to another aspect, a method for data transmission is provided, which includes
 receiving a label of a codeword in a codebook for eight-antenna sent by a User Equipment (UE);
 selecting the codeword identified by the label from the codebook for eight-antenna; and
 coding data to be sent by using the codeword, where
 the codebook for eight-antenna includes at least one rank-8 codeword for eight-antenna, the rank-8 codeword being generated by multiplying an inverse matrix of a rotation matrix for eight-antenna and an eight-dimensional matrix formed by rank-4 codewords for four-antenna, or being generated by extending rank-4 codewords for eight-antenna, where the rank-4 codeword for eight-antenna is obtained according to the codewords for four-antenna.

According to another aspect, a method for data transmission is provided, which includes:
 selecting a codeword in a codebook for eight-antenna; and
 sending a label of the codeword in the codebook for eight-antenna to a base station, where
 the codebook for eight-antenna includes at least one rank-8 codeword for eight-antenna, the rank-8 codeword for eight-antenna being generated by multiplying an inverse matrix of a rotation matrix for eight-antenna and an eight-dimensional matrix formed by rank-4 codewords for four-antenna, or being generated by extending rank-4 codewords for eight-antenna, where the rank-4 codeword for eight-antenna is obtained according to the codewords for four-antenna.

According to another aspect, a base station apparatus is provided, which including:
 a storage unit, configured to store a codebook for eight-antenna, where the codebook for eight-antenna includes at least one rank-8 codeword for eight-antenna, the rank-8 codeword for eight-antenna being generated by multiplying an inverse matrix of a rotation matrix for eight-antenna with an eight-dimensional matrix formed by rank-4 codewords for four-antenna; or being generated by extending rank-4 codewords for eight-antenna, where the rank-4 codeword for eight-antenna is obtained according to codewords for four-antenna;
 a receiver, configured to receive a label of a codeword in the codebook for eight-antenna sent by a UE;
 a searching unit, configured to select the codeword identified by the label in the codebook for eight-antenna;
 a coding unit, configured to code data to be sent by using the codeword found by the searching unit.

According to another aspect, a user equipment (UE) is provided, including:
 a storage unit, configured to store a codebook for eight-antenna, where the codebook for eight-antenna includes at least: a rank-8 codeword for eight-antenna, the rank-8 codeword for eight-antenna being generated by multiplying an inverse matrix of a rotation matrix for eight-antenna with an eight-dimensional matrix formed by rank-4 codewords for four-antenna, or being generated by extending rank-4 codewords for eight-antenna, where the rank-4 codewords for eight-antenna is obtained according to codewords for four-antenna;
 a selecting unit, configured to select a codeword from the codebook for eight-antenna; and
 a transmitting unit, configured to send a label of the selected codeword in the codebook for eight-antenna to a base station.

According to embodiments of the present invention, the rank-8 codeword for eight-antenna is obtained according to the rotation matrix for eight-antenna and the rank-4 codewords for four-antenna. The rank-8 codeword for eight-antenna can adapt to the characteristics of a dual-polarization channel, and are applicable to scenarios including dual-polarization strong correlation, dual-polarization weak correlation, single-polarization strong correlation, and single-polarization weak correlation.

According to embodiments of the present invention, the rank-1 codeword for eight-antenna or the rank-4 codeword for eight-antenna is obtained by using the codewords for four-antenna. The codeword for eight-antenna can adapt to the characteristics of a dual-polarization channel, and are applicable to scenarios including dual-polarization strong correlation, dual-polarization weak correlation, single-polarization strong correlation, and single-polarization weak correlation.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following.

FIG. 9 is a flow chart of a method for data transmission according to Embodiment 9 of the present invention;

FIG. 10 is a flow chart of a method for data transmission according to Embodiment 10 of the present invention;

DETAILED DESCRIPTION OF THE EMBODIMENTS

In order to make the objectives, technical solutions, and advantages of the present invention more comprehensible, the present invention is further described in detail below with reference to embodiments and the accompanying drawings. The network node in the present invention may be eNB or Relay Node (RN), and the RN or eNB is respectively taken as examples of the network nodes for illustration below.

Embodiment 1

Figure 1:
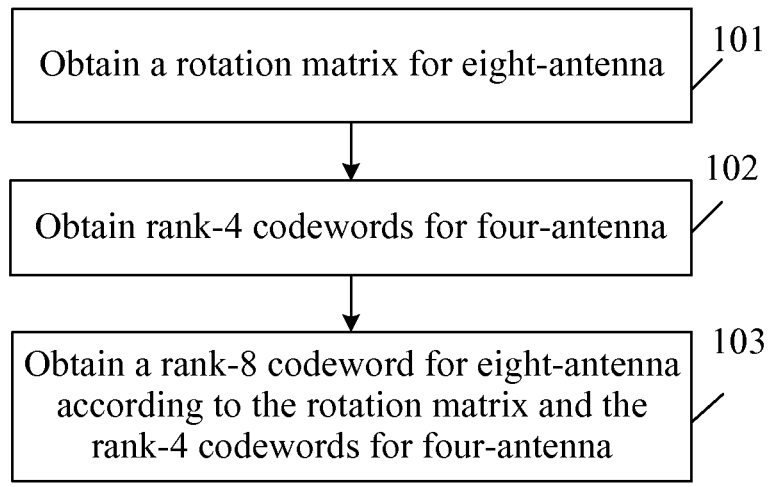
FIG. 1 is a flow chart of a method for generating a codebook according to Embodiment 1 of the present invention.

Embodiment 1 of the present invention provides a method for generating a codebook for eight-antenna. Referring to FIG. 1, the method includes the following.

At block 101, obtain a rotation matrix for eight-antenna (8TX);

At block 102, obtain rank 4 codewords for four-antenna (4TX).

At block 103, obtain a rank-8 codeword for eight-antenna by multiplying an inverse matrix of a rotation matrix for four-antenna with an eight-dimensional matrix formed by the rank-4 codewords for four-antenna. The rank-8 codeword for eight-antenna are used by a base station for coding data to be sent.

A structure of the eight-dimensional matrix formed by the rank-4 codewords for four-antenna is $$\begin{bmatrix} X_p^{(4)} & 0 \\ 0 & X_q^{(4)} \end{bmatrix}, \text{ or } \begin{bmatrix} 0 & X_q^{(4)} \\ X_p^{(4)} & 0 \end{bmatrix}, \text{ or }$$

$$\begin{bmatrix} X_p^{(4)} & 0 \\ 0 & X_p^{(4)} \end{bmatrix}, \text{ or } \begin{bmatrix} 0 & X_p^{(4)} \\ X_p^{(4)} & 0 \end{bmatrix},$$

where $X_q^{(4)}$ and $X_p^{(4)}$ are respectively the rank-4 codewords for four-antenna.

According to Embodiment 1 of the present invention, the rank-8 codeword for eight-antenna is obtained according to the rotation matrix for eight-antenna and the rank-4 codewords for four-antenna. The rank-8 codeword for eight-antenna can adapt to the characteristics of a dual-polarization channel, and are applicable to scenarios including dual-polarization strong correlation, dual-polarization weak correlation, single-polarization strong correlation, and single-polarization weak correlation.

Embodiment 2

Figure 2:
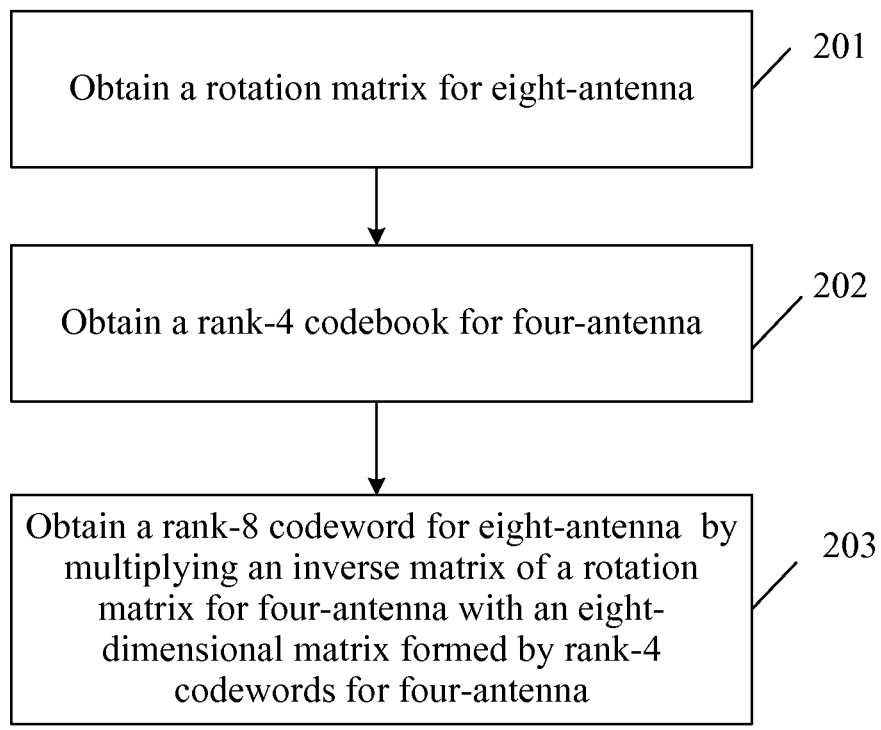
FIG. 2 is a flow chart of a method for generating a codebook according to Embodiment 2 of the present invention.
Figure 3:
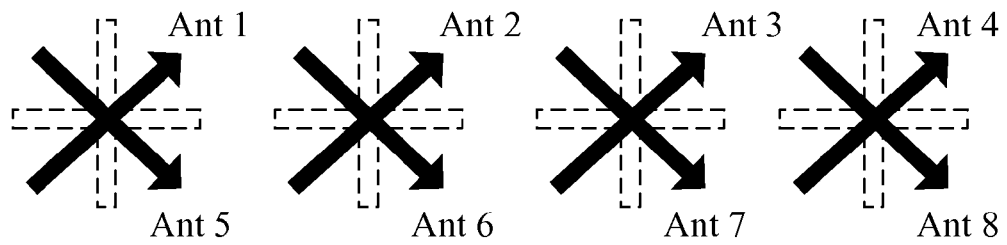
FIG. 3 is a schematic view of polarization directions of eight antennas according to Embodiment 2 of the present invention.

Embodiment 2 of the present invention provides a method for generating a codebook. Referring to FIG. 2, according to this embodiment, it is assumed that transmit antennas of a base station are grouped as {1, 2, 3, 4} and {5, 6, 7, 8} according to polarization directions, and the polarization directions of the antennas at the base station side are ±45° (as shown in FIG. 3); while the polarization directions of receiving antennas at a UE side are 0°/90°. A codeword for eight-antenna is obtained by using a rotation matrix for eight-antenna and codewords for four-antenna, and the method specifically includes the following.

At block 201, obtain the rotation matrix for eight-antenna. The rotation matrix for eight-antenna is $$U_{rot}^{(8)} = \begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \end{bmatrix} = \begin{bmatrix} I_4 & I_4 \\ I_4 & -I_4 \end{bmatrix}, \quad (2)$$

and a channel matrix having the polarization directions of ±45° is $H_{\pm45°} = H_{VH} \times U_{rot}^{(8)}$, where $H_{VH}$ is a channel matrix having the polarization directions of 0°/90°.

At block 202, obtain a rank-4 codebook for four-antenna (i.e., a codebook for four antennas with rank equals 4).

It is assumed that the rank-4 codebook for four-antenna obtained in this step is $CB^{(4)} = \{X_1^{(4)}, X_2^{(4)}, \ldots X_N^{(4)}\}$, where $X_1^{(4)}, X_2^{(4)} \ldots X_N^{(4)}$ are respectively rank-4 codewords for four-antenna.

At block 203, obtain a rank-8 codeword for eight-antenna by multiplying a reverse matrix of a rotation matrix for four-antenna with an eight-dimensional matrix formed by the rank-4 codewords for four-antenna.

A structure of the eight-dimensional matrix formed by the rank-4 codewords for four-antenna is $$\begin{bmatrix} X_p^{(4)} & 0 \\ 0 & X_q^{(4)} \end{bmatrix}, \text{ or } \begin{bmatrix} 0 & X_q^{(4)} \\ X_p^{(4)} & 0 \end{bmatrix}, \text{ or }$$

$$\begin{bmatrix} X_p^{(4)} & 0 \\ 0 & X_p^{(4)} \end{bmatrix}, \text{ or } \begin{bmatrix} 0 & X_p^{(4)} \\ X_p^{(4)} & 0 \end{bmatrix},$$

where $X_q^{(4)}$ and $X_p^{(4)}$ are respectively the rank-4 codewords for four-antenna.

Specifically, according to this step, the rank-8 codeword for eight-antenna can be obtained through the following Formula (3) or Formula (4):

$$W_m^{(8)} = (U_{rot}^{(8)})^{-1} \begin{bmatrix} X_p^{(4)} & 0 \\ 0 & X_q^{(4)} \end{bmatrix} \quad (3)$$

$$= \begin{bmatrix} I_4 & I_4 \\ I_4 & -I_4 \end{bmatrix} \begin{bmatrix} X_p^{(4)} & 0 \\ 0 & X_q^{(4)} \end{bmatrix}$$

$$= \begin{bmatrix} X_p^{(4)} & X_q^{(4)} \\ X_p^{(4)} & -X_q^{(4)} \end{bmatrix}$$

$$W_m^{(8)} = (U_{rot}^{(8)})^{-1} \begin{bmatrix} 0 & X_q^{(4)} \\ X_p^{(4)} & 0 \end{bmatrix} \quad (4)$$

$$= \begin{bmatrix} I_4 & I_4 \\ I_4 & -I_4 \end{bmatrix} \begin{bmatrix} 0 & X_q^{(4)} \\ X_p^{(4)} & 0 \end{bmatrix}$$

$$= \begin{bmatrix} X_p^{(4)} & X_q^{(4)} \\ -X_p^{(4)} & X_q^{(4)} \end{bmatrix}$$

where $W_m^{(8)}$ is an $m^{th}$ codeword in a rank-8 codebook for eight-antenna, and $X_p^{(4)}$ and $X_q^{(4)}$ are respectively codewords in the rank-4 codebook for four-antenna.

Alternatively, $W_m^{(8)}$ may also be obtained through the following formula $$W_m^{(8)} = (U_{rot}^{(8)})^{-1} \begin{bmatrix} X_p^{(4)} & 0 \\ 0 & X_p^{(4)} \end{bmatrix}$$

or $$W_m^{(8)} = (U_{rot}^{(8)})^{-1} \begin{bmatrix} 0 & X_p^{(4)} \\ X_p^{(4)} & 0 \end{bmatrix},$$

and the implementation of the present invention is not affected.

It should be noted that, the codeword in other polarization groupings of antennas may be obtained by switching rows of the rank-8 codeword for eight-antenna obtained in this step; and the codeword is not changed by multiplying rows or columns of the rank-8 codeword for eight-antenna with a scalar.

According to Embodiment 2 of the present invention, the rank-8 codeword for eight-antenna is obtained according to the rotation matrix for eight-antenna and the rank-4 codewords for four-antenna. The rank-8 codeword for eight-antenna is based on the rank-4 codewords for four-antenna, so that the complexity of the codebook design is simplified. The codeword for eight-antenna obtained through the embodiment of the present invention has a nested characteristic and a finite character set, which may decrease the computational complexity of a Channel Quality Indicator (CQI) and reduce the storage space of a base station and a UE. The codeword for eight-antenna may be applicable to scenarios including dual-polarization strong correlation, dual-polarization weak correlation, single-polarization strong correlation, and single-polarization weak correlation, etc.

Embodiment 3

Figure 4:
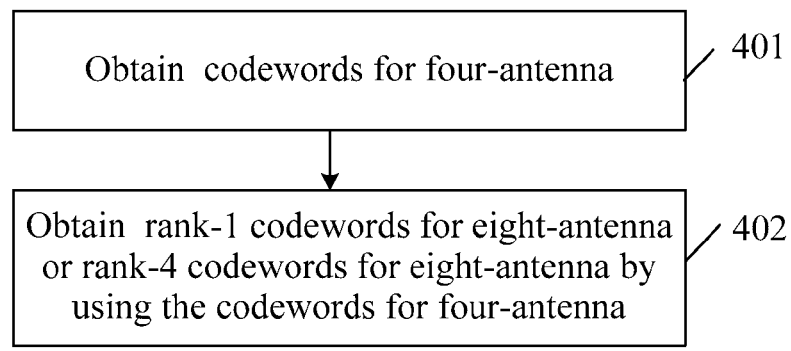
FIG. 4 is a flow chart of a method for generating a codebook according to Embodiment 3 of the present invention.

Embodiment 3 of the present invention provides a method for generating a codebook. Referring to FIG. 4, the method includes the following.

At block 401, obtain a codeword for four-antenna.

At block 402, obtain one or more rank-1 codeword for eight-antenna or one or more rank-4 codeword for eight-antenna by using the codewords for four-antenna.

According to Embodiment 3 of the present invention, the rank-1 codeword for eight-antenna or the rank-4 codeword for eight-antenna is directly obtained by using the codeword for four-antenna, which simplifies the complexity of the codebook design, and may be applicable to scenarios including dual-polarization strong correlation, dual-polarization weak correlation, single-polarization strong correlation, and single-polarization weak correlation, etc.

Embodiment 4

Figure 5:
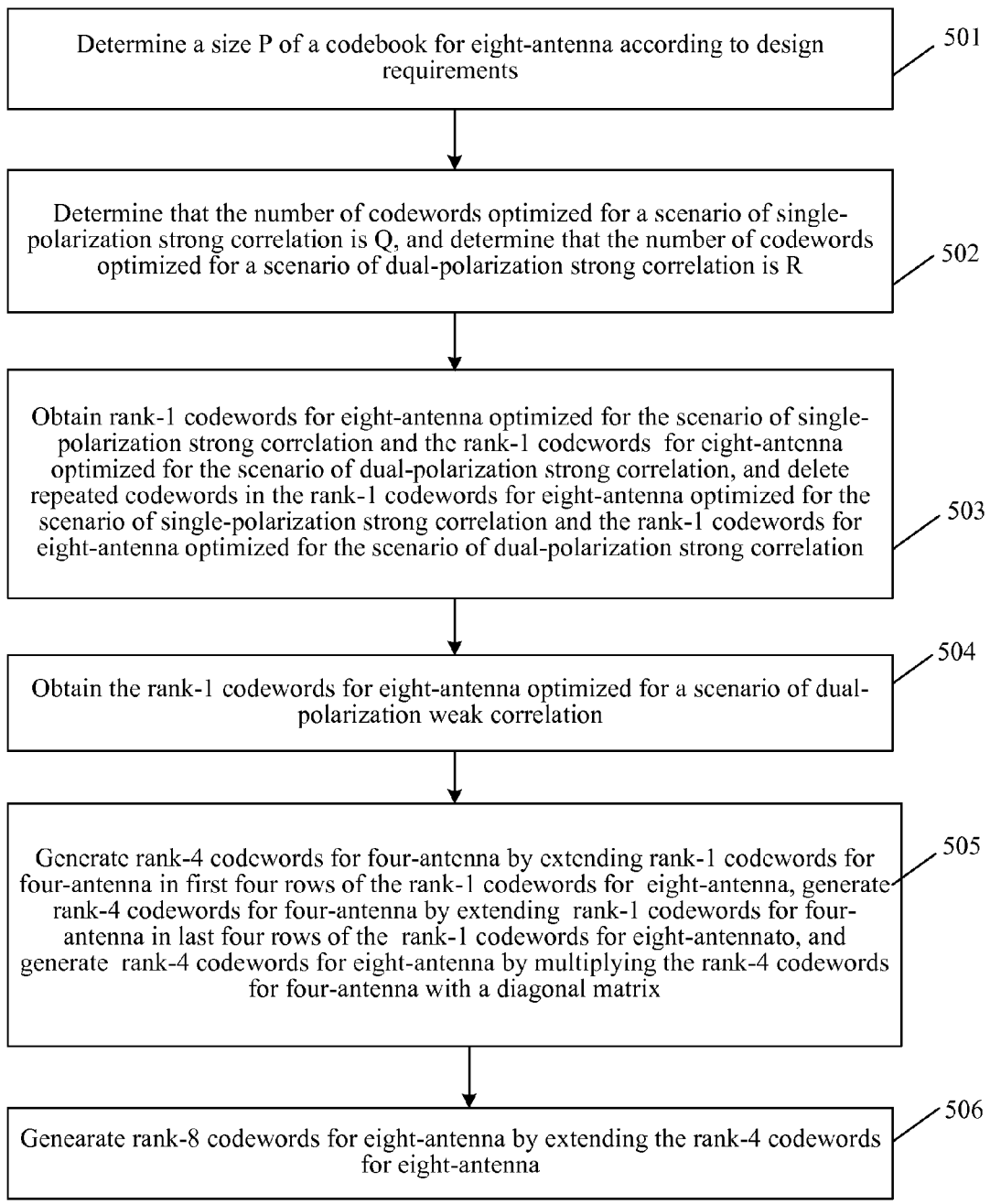
FIG. 5 is a flow chart of a method for generating a codebook according to Embodiment 4 of the present invention.

Embodiment 4 of the present invention provides a method for generating a codebook. Referring to FIG. 5, in this method, obtaining rank-1 codeword for eight-antenna by using a codeword for four-antenna, obtaining a rank-4 codeword for eight-antenna by using the rank-1 codeword for eight-antenna, and obtaining a rank-8 codeword for eight-antenna by extending the rank-4 codeword for eight-antenna. This method specifically includes the following.

At block 501, determine a size P of a codebook for eight-antenna codebook according to design requirements.

The size of the codebook for eight-antenna is the number of the codewords in the codebook for eight-antenna.

At block 502, determine that the number of the codewords optimized for a scenario of single-polarization strong correlation is Q, and that the number of the codewords optimized for a scenario of dual-polarization strong correlation is R, where Q+R<P.

At block 503, obtain the rank-1 codeword for eight-antenna optimized for the scenario of single-polarization strong correlation and the rank-1 codeword for eight-antenna optimized for the scenario of dual-polarization strong correlation, and delete a repeated codeword in the rank-1 codeword eight-antenna optimized for the scenario of single-polarization strong correlation and the eight-antenna rank-1 codeword optimized for the scenario of dual-polarization strong correlation.

Specifically, a process for determining the eight-antenna rank-1 codeword optimized for the scenario of single-polarization strong correlation specifically includes the following.

(1) Discrete Fourier Transformation (DFT) based rank-1 codewords for four transmit antennas (also referred to as DFT based rank-1 codewords for four-antenna) having a size of Q are generated by using Formula (5):

$$D_{g,mn}^{(N_T)} = \exp\left(j\frac{2\pi}{N_T}m\left(n+\frac{g}{Q}\right)\right)/N_T \qquad (5)$$

where $N_T$ is the number of 4 of the transmit antennas, and $D_{g,mn}^{(N_T)}$ is an element of an $m^{th}$ row and an $n^{th}$ column of a $g^{th}$ codeword in the codebook.

(2) The rank-1 codeword for eight-antenna is obtained by multiplying the DFT based rank-1 codeword for four transmit antennas $v_p^{(4)}$ with an optimized parameter $e^{j\theta_p}$, and then concatenating the DFT based rank-1 codeword for four transmit antennas $v_p^{(4)}$ and a matrix obtained by the multiplication.

The rank-1 codeword for eight-antenna is obtained by using Formulas (6) and (7):

$$u_p^{(8)} = \begin{bmatrix} v_p^{(4)} \\ e^{j\theta_p} v_p^{(4)} \end{bmatrix}, p \in \{1, 2, \ldots Q\} \qquad (6)$$

where the optimized parameter $$e^{j\theta_p} = \left(\frac{v_p^4(2)}{v_p^4(1)}\right)^4, \qquad (7)$$

and where $v_p^{(4)}$ represents the DFT based rank-1 codeword for four transmit antennas obtained according to $D_{g,mn}^{(N_T)}$.

As for scenarios of dual-polarization correlation, in this embodiment, it is assumed that polarization directions of the antennas at a base station side are ±45°, and the polarization directions of receiving antennas at a UE side are 0°/90°. Specifically, a process for determining the rank-1 codeword for eight-antenna optimized for the scenario of dual-polarization strong correlation includes the following.

(1) Rank-4 codewords for four transmit antenna are obtained through following:

$$M_r^{(4)} = \begin{bmatrix} 1 & 0 & 1 & 0 \\ \alpha_r & 0 & -\alpha_r & 0 \\ 0 & 1 & 0 & 1 \\ 0 & \beta_r & 0 & -\beta_r \end{bmatrix}, \qquad (8)$$

$$r = 1, 2, \ldots R/2$$

$$M_r^{(4)} = \begin{bmatrix} 0 & 1 & 0 & 1 \\ 0 & \beta_{r-R/2} & 0 & -\beta_{r-R/2} \\ 1 & 0 & 1 & 0 \\ \alpha_{r-R/2} & 0 & -\alpha_{r-R/2} & 0 \end{bmatrix}, \qquad (9)$$

$$r = R/2 + 1, \ldots R$$

where $$\alpha_r, \beta_r \in \Psi_M = \{e^{j\frac{2\pi}{M}m} | m = 0, 1, \ldots M-1\},$$

the rank-4 codewords for four transmit antenna obtained in this step need to ensure that a matrix obtained by switching a second column with a third column in $M_r^{(4)}$ is a block diagonal matrix.

(2) If the polarization groupings of antennas are $\{1, 2, 5, 6\}$ and $\{3, 4, 7, 8\}$, the rank-1 codeword for eight-antenna is obtained by using Formula (10). If the polarization groupings of antennas are $\{1, 2, 7, 8\}$ and $\{3, 4, 5, 6\}$, the rank-1 codeword for eight-antenna is obtained by using Formula (II).

When the polarization groupings of antennas are $\{1, 2, 5, 6\}$ and $\{3, 4, 7, 8\}$, a matrix having four rows and one column is obtained by multiplying a rotation matrix for four-antenna with a first column of $M_r^{(4)}$. The matrix having four rows and one column is multiplied with an optimized parameter $e^{j\Theta_r}$ to generate a matrix. The rank-1 codeword for eight-antenna is obtained by concatenating the matrix generated by multiplying the matrix having four rows and one column with the optimized parameter $e^{j\Theta_r}$, and the matrix having four rows and one column:

$$u_r^{(8)} = \begin{bmatrix} U_{rot}^{(4)} M_r^{(4)}(:,1) \\ e^{j\Theta_r} U_{rot}^{(4)} M_r^{(4)}(:,1) \end{bmatrix}, r \in \{1, 2, \ldots R\} \qquad (10)$$

where $$U_{rot}^{(4)} = \begin{bmatrix} 1 & 0 & 1 & 0 \\ 0 & 1 & 0 & 1 \\ 1 & 0 & -1 & 0 \\ 0 & 1 & 0 & -1 \end{bmatrix},$$

and $$e^{j\Theta_r} = \begin{cases} (\alpha_r)^2 & r = 1, 2, \ldots R/2 \\ (\alpha_{r-R/2})^2 & r = R/2+1, \ldots R. \end{cases}$$

When the polarization groupings of antennas are $\{1, 2, 7, 8\}$ and $\{3, 4, 5, 6\}$, a first matrix is obtained by multiplying a rotation matrix for four-antenna with a first column of $M_r^{(4)}$, if r is in a range of 1 to R/2, a second matrix is obtained by multiplying the rotation matrix for four-antenna with a first column of $M_{r+R/2}^{(4)}$ and the optimized parameter $e^{j\Theta_r}$, and the eight-antenna rank-1 codeword is obtained by concatenating the first matrix and the second matrix; while if r is in a range of (R/2)+1 to R, a third matrix is obtained by multiplying a rotation matrix for four-antenna with a first column of $M_{r-R/2}^{(4)}$ and the optimized parameter $e^{j\Theta_r}$, and the eight-antenna rank-1 codeword is obtained by concatenating the first matrix and the third matrix:

$$u_r^{(8)} = \begin{bmatrix} U_{rot}^{(4)} M_r^{(4)}(:,1) \\ e^{j\Theta_r} U_{rot}^{(4)} M_{r+R/2}^{(4)}(:,1) \end{bmatrix}, r \in \{1, 2, \ldots R/2\} \qquad (11)$$

$$u_r^{(8)} = \begin{bmatrix} U_{rot}^{(4)} M_r^{(4)}(:,1) \\ e^{j\Theta_r} U_{rot}^{(4)} M_{r-R/2}^{(4)}(:,1) \end{bmatrix}, r \in \{R/2+1, \ldots R\}$$

where $$U_{rot}^{(4)} = \begin{bmatrix} 1 & 0 & 1 & 0 \\ 0 & 1 & 0 & 1 \\ 1 & 0 & -1 & 0 \\ 0 & 1 & 0 & -1 \end{bmatrix},$$

and

-continued $$e^{j\theta_r} = \begin{cases} (\alpha_r)^2 & r = 1, 2, \ldots R/2 \\ (\alpha_{r-R/2})^2 & r = R/2+1, \ldots R. \end{cases}$$

It should be noted that, a definition for repeated rank-1 codeword is that if a codeword a can be written as a codeword b multiplied with a scalar c, that is, a=b·c, the codeword a is repeated with the codeword c.

At block 504, obtain the rank-1 codeword for eight-antenna optimized for a scenario of dual-polarization weak correlation.

It is assumed that, at block 503, the number of repeated codewords of the rank-1 codewords for eight-antenna optimized for the scenario of single-polarization strong correlation and the rank-1 codewords for eight-antenna optimized for the scenario of dual-polarization strong correlation is S, so that the number of the rank-1 codewords for eight-antenna optimized for the scenario of dual-polarization weak correlation is P−(Q+R)+S.

As for the scenario of dual-polarization weak correlation, a fourth matrix is obtained by multiplying a rotation matrix for four-antenna with a first column of $M_{r1}^{(4)}$, a fifth matrix is obtained by multiplying the rotation matrix for four-antenna with a first column of $M_{r2}^{(4)}$ and an optimized parameter $e^{j\theta_t}$, and the rank-1 codeword for eight-antenna is obtained by concatenating the fourth matrix and the fifth matrix.

If the polarization groupings of antennas are $\{1, 2, 5, 6\}$ and $\{3, 4, 7, 8\}$, the rank-1 codeword for eight-antenna is obtained by using the following Formula (12):

$$u_t^{(8)} = \begin{bmatrix} U_{rot}^{(4)} M_{r1}^{(4)}(:, 1) \\ e^{j\theta_t} U_{rot}^{(4)} M_{r2}^{(4)}(:, 1) \end{bmatrix} \tag{12}$$

$t \in \{1, 2, \ldots P-Q-R+S\}$, $r1 \neq r2$, $r1, r2 \in \{1, 2, \ldots R/2\} \cup r1, r2 \in \{R/2+1, \ldots R\}$.

If the polarization groupings of antennas are $\{1, 2, 7, 8\}$ and $\{3, 4, 5, 6\}$, rank-1 codeword for eight-antenna is obtained by using the following Formula (13):

$$u_t^{(8)} = \begin{bmatrix} U_{rot} M_{r1}^{(4)}(:, 1) \\ e^{j\theta_t} U_{rot} M_{r2}^{(4)}(:, 1) \end{bmatrix} \tag{13}$$

$t \in \{1, 2, \ldots P-Q-R+S\}$, $|r1 - r2| \neq R/2$, $r1 \in \{1, 2, \ldots R/2\} \cap r2 \in \{R/2+1, \ldots R\}$ $\cup$ $r1 \in \{R/2+1, \ldots R\} \cap r2 \in \{1, 2, \ldots R/2\}$ At block 505, generate a rank-4 codeword for eight-antenna according to a rank-4 codeword for four-antenna generated by extending a rank-1 codeword for four-antenna in first four rows of the rank-1 codeword for eight-antenna, and a rank-4 codeword for four-antenna generated by extending a rank-1 codeword for four-antenna in last four rows of the rank-1 codeword for eight-antenna and then multiplied with a diagonal matrix.

(1) As for the scenario of single-polarization strong correlation, the following two manners may be adopted to obtain the rank-4 codeword for four-antenna $M_p$.

A first manner is that a rank-4 codeword for four-antenna $M_p$ is generated by performing Householder transformation on a rank-1 codeword for four-antenna (as shown in Formula (13a)):

$$M_p = \begin{bmatrix} 1 & 0 & 0 & 0 \\ 0 & -1 & 0 & 0 \\ 0 & 0 & -1 & 0 \\ 0 & 0 & 0 & -1 \end{bmatrix} v_p^{(4)} \tag{13a}$$

where $v_p^{(4)}$ represents the rank-1 codeword for four-antenna.

A second manner is that a rank-4 codeword for four-antenna $M_p$ is generated by using the following Formula (13b) and taking Formula (13c) as a constraint condition:

$$M_p = e_p \cdot T \tag{13b}$$

where $e_p$ is a diagonal matrix, $e_p$ is relevant to $v_p^{(4)}$, and $v_p^{(4)}$ is a first column of $M_p$ (see Formula (13c)):

$$v_p^{(4)} = M_p(:,1) \tag{13c}$$

where T is any 4×4-dimensional Unitary matrix (such as a DFT matrix).

As for the scenario of dual-polarization strong correlation, a rank-1 codeword for four-antenna in a rank-1 codeword for eight-antenna is extended to generate a rank-4 codeword for four-antenna, as shown in Formula (14):

$$U_{rot} M_r^{(4)}(:,1) \rightarrow U_{rot} M_r^{(4)}(:,1:4) \tag{14}$$

(2) Multiplying a rank-4 codeword for four-antenna obtained by extending the rank-1 codeword for four-antenna in last four rows of a rank-1 codeword for eight-antenna with a diagonal matrix, so as to obtain a rank-4 codeword for eight-antenna.

The following matrix is the rank-4 codeword for eight-antenna optimized for the scenario of single-polarization strong correlation:

$$\begin{bmatrix} M_p^{(4)} \\ M_p^{(4)} \Lambda_p \end{bmatrix}.$$

The following matrix is the rank-4 codeword for eight-antenna optimized for the scenario of dual-polarization strong correlation when the polarization groupings of antennas are $\{1, 2, 5, 6\}$ and $\{3, 4, 7, 8\}$:

$$\begin{bmatrix} U_{rot}^{(4)} M_r^{(4)}(:, 1:4) \\ U_{rot}^{(4)} M_r^{(4)}(:, 1:4) \Lambda_r \end{bmatrix}.$$

The following matrix is the rank-4 codeword for eight-antenna optimized for the scenario of dual-polarization weak correlation:

$$\begin{bmatrix} U_{rot}^{(4)} M_{r1}^{(4)}(:, 1:4) \\ U_{rot}^{(4)} M_{r2}^{(4)}(:, 1:4) \Lambda_t \end{bmatrix}$$

where $\Lambda$ is the diagonal matrix used for optimizing a code distance of a high rank (that is, the rank>1), and $\Lambda(1,1)=e^{j\theta}$ is already set and determined by a rank-1 codeword optimizing process; $\Lambda(2, 2)$ may be determined through directivity, or may be obtained by optimizing a chordal distance of rank-2 codewords.

At block 506, generate a rank-8 codeword for eight-antenna by extending the rank-4 codewords for eight-antenna. Orthogonality of the codewords in a rank-8 codebook for eight-antenna is ensured.

A specific implementation manner of this step may be: using the rank-4 codeword for eight-antenna as first four columns of the rank-8 codeword for eight-antenna, and using negative values of first four rows or last four rows of the rank-4 codeword for eight-antenna as last four columns of the rank-8 codeword for eight-antenna; or, using the rank-4 codeword for eight-antenna as last four columns of the rank-8 codeword for eight-antenna, and using negative values of first four rows or last four rows of the rank-4 codeword for eight-antenna as first four columns of the rank-8 codeword for eight-antenna.

The rank-8 codeword for eight-antenna optimized for the scenario of single-polarization strong correlation may form the following matrix:

$$\begin{bmatrix} M_p^{(4)} & M_p^{(4)} \\ M_p^{(4)}\Lambda_p & -M_p^{(4)}\Lambda_p \end{bmatrix}.$$

When the polarization groupings of antennas are $\{1, 2, 5, 6\}$ and $\{3, 4, 7, 8\}$, the rank-8 codeword for eight-antenna optimized for the scenario of dual-polarization strong correlation may form the following matrix:

$$\begin{bmatrix} U_{rot}^{(4)}M_r^{(4)}(:,1:4) & U_{rot}^{(4)}M_r^{(4)}(:,1:4) \\ U_{rot}^{(4)}M_r^{(4)}(:,1:4)\Lambda_r & -U_{rot}^{(4)}M_r^{(4)}(:,1:4)\Lambda_r \end{bmatrix}.$$

The rank-8 codeword for eight-antenna optimized for the scenario of dual-polarization weak correlation may form the following matrix:

$$\begin{bmatrix} M_p^{(4)} & M_p^{(4)} \\ M_p^{(4)}\Lambda_p & -M_p^{(4)}\Lambda_p \end{bmatrix}.$$

In the above embodiment, the rank-1 codeword for eight-antenna is the codeword for eight antennas with the rank of 1, the rank-4 codeword for eight-antenna is the codeword for eight antennas with the rank of 4, the rank-8 codeword for eight-antenna is the codeword for eight antennas with the rank of 8, the rank-1 codeword for four-transmit-antenna is the codeword for four transmit antennas with the rank of 1, and the rank-4 codeword for four-transmit-antenna is the codeword for four transmit antennas with the rank of 4.

According to Embodiment 4 of the present invention, generate the rank-1 codeword for eight-antenna by using the rank-4 codewords for four-antenna, and generate the rank-4 codeword for eight-antenna by extending the rank-4 codewords for eight-antenna. The codeword for eight-antenna is generated based on the codeword for four-antenna, thereby simplifying the complexity of the codebook design. The codeword for eight-antenna has a nested characteristic and a finite character set, which may decrease the computational complexity of a CQI. The codeword for eight-antenna is applicable to scenarios including dual-polarization strong correlation, dual-polarization weak correlation, single-polarization strong correlation, and single-polarization weak correlation, etc.

Embodiment 5

Embodiment 5 of the present invention provides a method for generating a codebook, and a difference of this method from Embodiment 4 is as follows.

A design method of eight-antenna rank-1 codewords optimized for a scenario of single-polarization strong correlation is different, and a specific design process includes the following.

DFT based rank-1 codeword for eight transmit antennas $x_p^{(8)}$ having a size of Q is generated first, where $p \in \{1, 2, \ldots Q\}$. Formula (5) may be employed for implementation, and at this time, $N_T$ in Formula (5) is 8.

Rank-1 codeword for four-antenna $v_p^{(4)}$ is obtained by using the following formula:

$$v_p^{(4)} = \begin{bmatrix} x_p^{(8)}(1:2) \\ x_p^{(8)}(5:6) \end{bmatrix}, \quad p \in \{1, 2, \ldots Q\}.$$

The rank-1 codeword for eight-antenna is generated by concatenating and rotating the codeword for four-antenna, and a specific implementation manner may use the following formula:

$$u_p^{(8)} = \begin{bmatrix} v_p^{(4)} \\ e^{j\theta_p} v_p^{(4)} \end{bmatrix}, \quad p \in \{1, 2, \ldots Q\}, \text{ where } e^{j\theta_p} = \left(\frac{v_p^4(2)}{v_p^4(1)}\right)^2.$$

According to the embodiment of the present invention, polarization groupings of antennas are $\{1, 2, 3, 4\}$ and $\{5, 6, 7, 8\}$; therefore, a third row and a fourth row of the rank-8 codeword for eight-antenna generated from Embodiment 2 are switched with a fifth row and a sixth row, and reference is made to the following formula:

$$W_{(i)}^{(8)} = \Pi \begin{bmatrix} M_i^{(4)} & M_i^{(4)} \\ M_i^{(4)}\Lambda_i & -M_i^{(4)}\Lambda_i \end{bmatrix} \text{ where }$$

$$\Pi = \begin{bmatrix} 1 & 0 & 0 & 0 & 0 & 0 & 0 & 0 \\ 0 & 1 & 0 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 1 & 0 \\ 0 & 0 & 0 & 0 & 0 & 0 & 0 & 1 \end{bmatrix}.$$

According to Embodiment 5 of the present invention, generate the rank-1 codeword for eight-antenna by using the four-antenna rank-4 codeword, and generate the rank-4 codeword for eight-antenna, and then generate the rank-8 codeword for eight-antenna by extending the rank-4 codewords for eight-antenna. The codeword for eight-antenna is based on the codeword for four-antenna, thereby simplifying the complexity of the codebook design. The codeword for eight-antenna has a nested characteristic and a finite character set, which may decrease the computational complexity of a CQI and reduce the storage space of a base station and a UE. The codeword for eight-antenna is applicable to scenarios including dual-polarization strong correlation, dual-polarization weak correlation, single-polarization strong correlation, and single-polarization weak correlation, etc.

Embodiment 6

Figure 6:
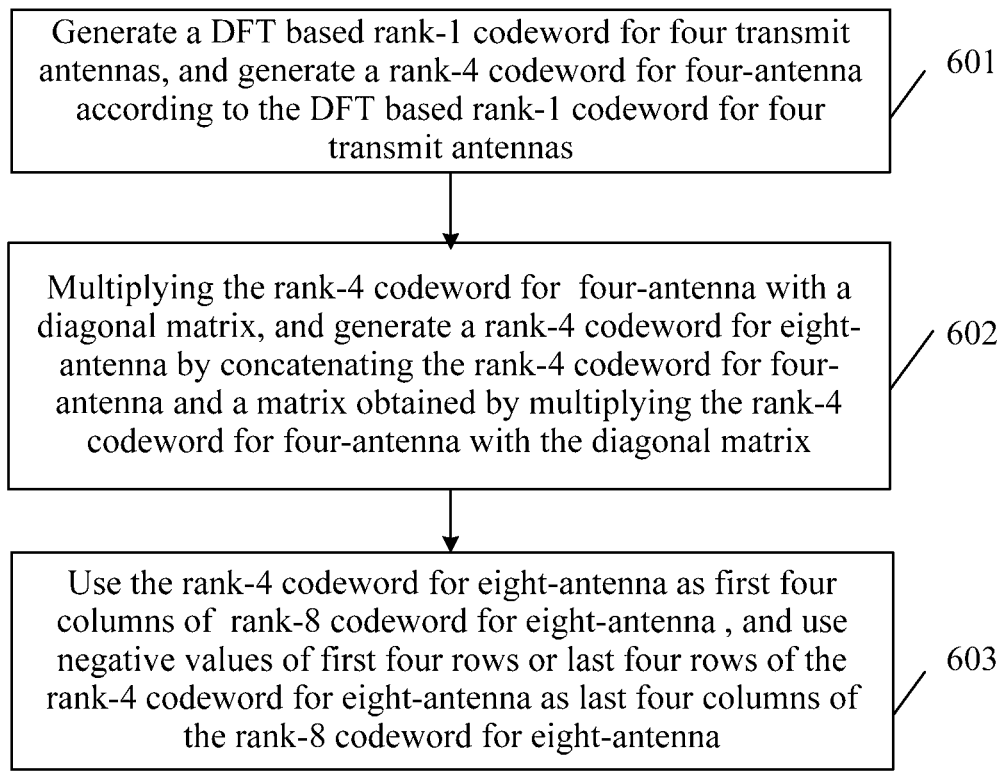
FIG. 6 is a flow chart of a method for generating a codebook according to Embodiment 6 of the present invention.

Embodiment 6 of the present invention provides a method for generating a codebook, which is applicable to a scenario of single-polarization strong correlation. Referring to FIG. 6, a rank-4 codeword for eight-antenna is directly obtained from a rank-4 codeword for four-antenna according to this embodiment. The method specifically includes the following.

At block 601, as for the scenario of single-polarization strong correlation, DFT based rank-1 codeword for four transmit antennas is generated, and a rank-4 codeword for four-antenna is generated according to the DFT based rank-1 codeword for four transmit antennas.

A manner for generating the DFT based rank-1 codewords for four transmit antennas having a size of Q may use Formula (5), and a manner for obtaining the rank-4 codewords for four-antenna according to the DFT based rank-1 codewords for four transmit antennas may use Formula (13a) or Formulas (13b) and (13c).

At block 602, the rank-4 codeword for four-antenna is multiplied by a diagonal matrix, and the rank-4 codeword for eight-antenna is generated by concatenating the rank-4 codeword for four-antenna and a matrix obtained by multiplying the rank-4 codeword for four-antenna with the diagonal matrix.

A structure of the rank-4 codeword for eight-antenna may be $$\begin{bmatrix} M_p^{(4)} \\ M_p^{(4)} \Lambda_p \end{bmatrix},$$

where $\Lambda_p$ is the diagonal matrix, p represents that the rank-4 codeword for eight-antenna is a $p^{th}$ codeword in a rank-4 codebook for eight-antenna, and $M_p^{(4)}$ represents the rank-4 codeword for four-antenna.

Alternatively, in this step, a first rank-4 codeword for four-antenna is multiplied by the diagonal matrix, and the rank-4 codeword for eight-antenna is obtained by concatenating a second rank-4 codeword for four-antenna and a matrix obtained by multiplying the first four-antenna rank-4 codeword with the diagonal matrix.

At block 603, the rank-4 codeword for eight-antenna is used as first four columns of rank-8 codeword for eight-antenna, and negative values of first four rows or last four rows of the rank-4 codeword for eight-antenna are used as last four columns of the rank-8 codeword for eight-antenna; or, the rank-4 codeword for eight-antenna is used as last four columns of the rank-8 codeword for eight-antenna, and negative values of first four rows or last four rows of the rank-4 codeword for eight-antenna are used as first four columns of the rank-8 codeword for eight-antenna.

According to Embodiment 6 of the present invention, generate the rank-4 codeword for four-antenna according to the DFT based rank-1 codeword for four transmit antennas, then generate the rank-4 codeword for eight-antenna according to the rank-4 codeword for four-antenna, and generate rank-8 codeword for eight-antenna by extending the rank-4 codewords for eight-antenna. The codeword for eight-antenna is based on the codeword for four-antenna, thereby simplifying the complexity of the codebook design. The codeword for eight-antenna has a nested characteristic and a finite character set, which may decrease the computational complexity of a CQI. The codeword for eight-antenna is applicable to scenarios including dual-polarization strong correlation, dual-polarization weak correlation, single-polarization strong correlation, and single-polarization weak correlation, etc.

Embodiment 7

Figure 7:
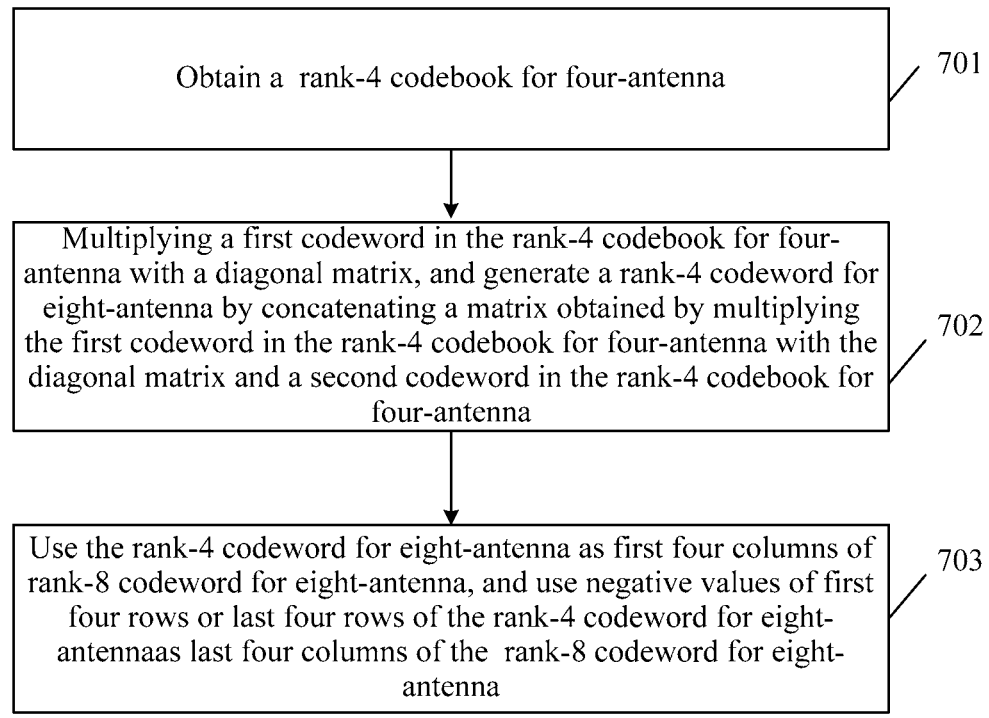
FIG. 7 is a flow chart of a method for generating a codebook according to Embodiment 7 of the present invention.

Embodiment 7 of the present invention provides a method for generating a codebook, which is applicable to scenarios of single-polarization correlation and dual-polarization correlation. Referring to FIG. 7, a rank-4 codeword for eight-antenna is directly generated from rank-4 codewords for four-antenna according to this method, and this method specifically includes the following.

At block 701, obtain a rank-4 codebook for four-antenna.

A structure of the rank-4 codebook for four-antenna is as follows:

$$CB^{(4)} = \{X_1^{(4)}, X_2^{(4)}, \ldots X_N^{(4)}\}.$$

At block 702, a first codeword (that is, a first rank-4 codeword for four-antenna) in the rank-4 codebook for four-antenna is multiplied by a diagonal matrix, and the rank-4 codeword for eight-antenna is generated by concatenating a matrix obtained by multiplying the first codeword in the rank-4 codebook for four-antenna with the diagonal matrix and a second codeword in the rank-4 codebook for four-antenna. In this step, said a first codeword and said a second codeword do not represent the first codeword and the second codeword (that is, a second rank-4 codeword for four-antenna) in the four-antenna rank-4 codebook, but represent two different codewords in the rank-4 codebook for four-antenna.

At block 703, the rank-4 codeword for eight-antenna is used as first four columns of rank-8 codeword for eight-antenna, and negative values of first four rows or last four rows of the rank-4 codeword for eight-antenna are used as last four columns of the rank-8 codeword for eight-antenna; or, the rank-4 codeword for eight-antenna is used as last four columns of rank-8 codeword for eight-antenna, and negative values of first four rows or last four rows of the rank-4 codeword for eight-antenna are used as first four columns of the rank-8 codeword for eight-antenna, and a structure of the generated rank-8 codeword for eight-antenna is as follows:

$$W_m^{(8)} = \begin{bmatrix} X_p^{(4)} & X_p^{(4)} \\ X_q^{(4)} \Lambda_m & -X_q^{(4)} \Lambda_m \end{bmatrix}, \quad p \in 1, 2, \ldots N, \quad q \in 1, 2, \ldots N,.$$

In the above step 702, a codeword in the rank-4 codebook for four-antenna is multiplied by the diagonal matrix, and the rank-4 codeword for eight-antenna is generated by concatenating a matrix obtained through the multiplication and the same codeword. A matrix structure of a generated rank-8 codebook for eight-antenna is as follows:

$$W_m^{(8)} = \begin{bmatrix} X_p^{(4)} & X_p^{(4)} \\ X_p^{(4)} \Lambda_m & -X_p^{(4)} \Lambda_m \end{bmatrix}, \quad p \in 1, 2, \ldots N, \quad q \in 1, 2, \ldots N,.$$

According to Embodiment 7 of the present invention, the rank-4 codeword for eight-antenna is generated by using the rank-4 codeword for four-antenna, and the rank-4 codewords for eight-antenna is extended to generate the rank-8 codeword for eight-antenna. The codeword for eight-antenna is based on the codewords for four-antenna, thereby simplifying the complexity of the codebook design. The codeword for eight-antenna has a nested characteristic and a finite character set, which may decrease the computational complexity of a CQI and reduce the storage space of a base station and a UE. The codeword for eight-antenna is applicable to scenarios including dual-polarization strong correlation, dual-polarization weak correlation, single-polarization strong correlation, and single-polarization weak correlation, etc.

In order to make the embodiment of the present invention more comprehensible, an example is given below for illustration.

It is assumed that a character set is $$\Psi = \left\{\pm 1, \pm j, \pm \frac{1+j}{\sqrt{2}}, \pm \frac{1-j}{\sqrt{2}}\right\},$$

all elements of codewords in the eight-antenna codebook are the elements in the character set. It is assumed that the number of codewords in the codebook is N=16.

It is assumed that polarization groupings of antennas are $\{1, 2, 3, 4\}$ and $\{5, 6, 7, 8\}$, and a downlink MIMO codebook for eight-antenna obtained after a chordal distance optimization by using the technical solutions provided by the embodiment of the present invention is as follows:

$$W_i = \frac{1}{\sqrt{2}} \Pi \begin{bmatrix} M_i^{(4)} & M_i^{(4)} \\ M_i^{(4)}\Lambda_i & -M_i^{(4)}\Lambda_i \end{bmatrix} \text{ where}$$

$$\Pi = \begin{bmatrix} 1 & 0 & 0 & 0 & 0 & 0 & 0 & 0 \\ 0 & 1 & 0 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 1 & 0 \\ 0 & 0 & 0 & 0 & 0 & 0 & 0 & 1 \end{bmatrix},$$

$$M_i^{(4)} = I_4 - 2u_i u_i^H / u_i^H u_i.$$

The generated vector $u_i$ and diagonal matrix $\Lambda_i$ are as shown in Table 1.

TABLE 1

| Index | $u_i$ | $\Lambda_i$ |
|---|---|---|
| 0 | $u_0 = [1\ -1\ -1\ -1]^T$ | $\text{diag}\{[1\ 1\ -1\ j]\}$ |
| 1 | $u_1 = [1\ -1\ 1\ 1]^T$ | $\text{diag}\{[1\ 1\ -1\ 1]\}$ |
| 2 | $u_2 = [1\ -j\ -1\ -j]^T$ | $\text{diag}\{[-1\ -j\ 1\ j]\}$ |
| 3 | $u_3 = [1\ -j\ 1\ j]^T$ | $\text{diag}\{[-1\ -1\ 1\ j]\}$ |
| 4 | $u_4 = [1\ 1\ -1\ 1]^T$ | $\text{diag}\{[1\ 1\ 1\ 1]\}$ |
| 5 | $u_5 = [1\ 1\ 1\ -1]^T$ | $\text{diag}\{[1\ 1\ -j\ j]\}$ |
| 6 | $u_6 = [1\ j\ -1\ j]^T$ | $\text{diag}\{[-1\ -1\ 1\ j]\}$ |
| 7 | $u_7 = [1\ j\ 1\ -j]^T$ | $\text{diag}\{[-1\ -1\ -j\ -j]\}$ |
| 8 | $u_8 = \left[1\ -\frac{1+j}{\sqrt{2}}\ 1\ \frac{1+j}{\sqrt{2}}\right]^T$ | $\text{diag}\{[j\ j\ -j\ -1]\}$ |
| 9 | $u_9 = \left[1\ -\frac{1+j}{\sqrt{2}}\ -1\ -\frac{1+j}{\sqrt{2}}\right]^T$ | $\text{diag}\{[j\ j\ 1\ -j]\}$ |
| 10 | $u_{10} = \left[1\ \frac{1-j}{\sqrt{2}}\ 1\ \frac{-1+j}{\sqrt{2}}\right]^T$ | $\text{diag}\{[-j\ 1\ j\ j]\}$ |
| 11 | $u_{11} = \left[1\ \frac{1-j}{\sqrt{2}}\ -1\ \frac{1-j}{\sqrt{2}}\right]^T$ | $\text{diag}\{[-j\ -j\ -j\ j]\}$ |
| 12 | $u_{12} = \left[1\ \frac{1+j}{\sqrt{2}}\ 1\ \frac{-1-j}{\sqrt{2}}\right]^T$ | $\text{diag}\{[j\ j\ j\ -j]\}$ |
| 13 | $u_{13} = \left[1\ \frac{1+j}{\sqrt{2}}\ -1\ \frac{1+j}{\sqrt{2}}\right]^T$ | $\text{diag}\{[j\ j\ -1\ -j]\}$ |
| 14 | $u_{14} = \left[1\ \frac{-1+j}{\sqrt{2}}\ 1\ \frac{1-j}{\sqrt{2}}\right]^T$ | $\text{diag}\{[-j\ 1\ j\ -j]\}$ |
| 15 | $u_{15} = \left[1\ \frac{-1+j}{\sqrt{2}}\ -1\ \frac{-1+j}{\sqrt{2}}\right]^T$ | $\text{diag}\{[-j\ -j\ j\ 1]\}$ |

A mapping relation between the rank-8 codewords and other rank codewords is as shown in Table 2.

TABLE 2

| | | | | Number of layers $\upsilon$ | | | | |
|---|---|---|---|---|---|---|---|---|
| PMI | 1 | 2 | 3 | 4 | 5 | 6 | 7 | 8 |
| 0 | $W_0^{\{1\}}$ | $\frac{W_0^{\{13\}}}{\sqrt{2}}$ | $\frac{W_0^{\{134\}}}{\sqrt{3}}$ | $\frac{W_0^{\{1345\}}}{2}$ | $\frac{W_0^{\{13456\}}}{\sqrt{5}}$ | $\frac{W_0^{\{134562\}}}{\sqrt{6}}$ | $\frac{W_0^{\{1345627\}}}{\sqrt{7}}$ | $\frac{W_0^{\{13456278\}}}{\sqrt{8}}$ |
| 1 | $W_1^{\{1\}}$ | $\frac{W_1^{\{12\}}}{\sqrt{2}}$ | $\frac{W_1^{\{123\}}}{\sqrt{3}}$ | $\frac{W_1^{\{1235\}}}{2}$ | $\frac{W_1^{\{12356\}}}{\sqrt{5}}$ | $\frac{W_1^{\{123564\}}}{\sqrt{6}}$ | $\frac{W_1^{\{1235647\}}}{\sqrt{7}}$ | $\frac{W_1^{\{12356478\}}}{\sqrt{8}}$ |
| 2 | $W_2^{\{1\}}$ | $\frac{W_2^{\{14\}}}{\sqrt{2}}$ | $\frac{W_2^{\{143\}}}{\sqrt{3}}$ | $\frac{W_2^{\{1435\}}}{2}$ | $\frac{W_2^{\{14352\}}}{\sqrt{5}}$ | $\frac{W_2^{\{143528\}}}{\sqrt{6}}$ | $\frac{W_2^{\{1435287\}}}{\sqrt{7}}$ | $\frac{W_2^{\{14352876\}}}{\sqrt{8}}$ |
| 3 | $W_3^{\{1\}}$ | $\frac{W_3^{\{12\}}}{\sqrt{2}}$ | $\frac{W_3^{\{123\}}}{\sqrt{3}}$ | $\frac{W_3^{\{1234\}}}{2}$ | $\frac{W_3^{\{12346\}}}{\sqrt{5}}$ | $\frac{W_3^{\{123465\}}}{\sqrt{6}}$ | $\frac{W_3^{\{1234658\}}}{\sqrt{7}}$ | $\frac{W_3^{\{12346587\}}}{\sqrt{8}}$ |
| 4 | $W_4^{\{1\}}$ | $\frac{W_4^{\{12\}}}{\sqrt{2}}$ | $\frac{W_4^{\{124\}}}{\sqrt{3}}$ | $\frac{W_4^{\{1243\}}}{2}$ | $\frac{W_4^{\{12435\}}}{\sqrt{5}}$ | $\frac{W_4^{\{124358\}}}{\sqrt{6}}$ | $\frac{W_4^{\{1243586\}}}{\sqrt{7}}$ | $\frac{W_4^{\{12435867\}}}{\sqrt{8}}$ |

TABLE 2-continued

| PMI | 1 | 2 | 3 | 4 | 5 | 6 | 7 | 8 |
|---|---|---|---|---|---|---|---|---|
| 5 | $W_5^{\{1\}}$ | $W_5^{\{14\}}/\sqrt{2}$ | $W_5^{\{143\}}/\sqrt{3}$ | $W_5^{\{1435\}}/2$ | $W_5^{\{14356\}}/\sqrt{5}$ | $W_5^{\{143562\}}/\sqrt{6}$ | $W_5^{\{1435628\}}/\sqrt{7}$ | $W_5^{\{14356287\}}/\sqrt{8}$ |
| 6 | $W_6^{\{1\}}$ | $W_6^{\{13\}}/\sqrt{2}$ | $W_6^{\{134\}}/\sqrt{3}$ | $W_6^{\{1345\}}/2$ | $W_6^{\{13452\}}/\sqrt{5}$ | $W_6^{\{134526\}}/\sqrt{6}$ | $W_6^{\{1345267\}}/\sqrt{7}$ | $W_6^{\{13452678\}}/\sqrt{8}$ |
| 7 | $W_7^{\{1\}}$ | $W_7^{\{12\}}/\sqrt{2}$ | $W_7^{\{123\}}/\sqrt{3}$ | $W_7^{\{1234\}}/2$ | $W_7^{\{12346\}}/\sqrt{5}$ | $W_7^{\{123467\}}/\sqrt{6}$ | $W_7^{\{1234678\}}/\sqrt{7}$ | $W_7^{\{12346785\}}/\sqrt{8}$ |
| 8 | $W_8^{\{1\}}$ | $W_8^{\{13\}}/\sqrt{2}$ | $W_8^{\{134\}}/\sqrt{3}$ | $W_8^{\{1345\}}/2$ | $W_8^{\{13456\}}/\sqrt{5}$ | $W_8^{\{134562\}}/\sqrt{6}$ | $W_8^{\{1345627\}}/\sqrt{7}$ | $W_8^{\{13456278\}}/\sqrt{8}$ |
| 9 | $W_9^{\{1\}}$ | $W_9^{\{12\}}/\sqrt{2}$ | $W_9^{\{123\}}/\sqrt{3}$ | $W_9^{\{1234\}}/2$ | $W_9^{\{12346\}}/\sqrt{5}$ | $W_9^{\{123467\}}/\sqrt{6}$ | $W_9^{\{1234675\}}/\sqrt{7}$ | $W_9^{\{12346758\}}/\sqrt{8}$ |
| 10 | $W_{10}^{\{1\}}$ | $W_{10}^{\{13\}}/\sqrt{2}$ | $W_{10}^{\{134\}}/\sqrt{3}$ | $W_{10}^{\{1342\}}/2$ | $W_{10}^{\{13425\}}/\sqrt{5}$ | $W_{10}^{\{134257\}}/\sqrt{6}$ | $W_{10}^{\{1342576\}}/\sqrt{7}$ | $W_{10}^{\{13425768\}}/\sqrt{8}$ |
| 11 | $W_{11}^{\{1\}}$ | $W_{11}^{\{12\}}/\sqrt{2}$ | $W_{11}^{\{123\}}/\sqrt{3}$ | $W_{11}^{\{1235\}}/2$ | $W_{11}^{\{12356\}}/\sqrt{5}$ | $W_{11}^{\{123567\}}/\sqrt{6}$ | $W_{11}^{\{1235674\}}/\sqrt{7}$ | $W_{11}^{\{12356748\}}/\sqrt{8}$ |
| 12 | $W_{12}^{\{1\}}$ | $W_{12}^{\{13\}}/\sqrt{2}$ | $W_{12}^{\{134\}}/\sqrt{3}$ | $W_{12}^{\{1342\}}/2$ | $W_{12}^{\{13425\}}/\sqrt{5}$ | $W_{12}^{\{134258\}}/\sqrt{6}$ | $W_{12}^{\{1342587\}}/\sqrt{7}$ | $W_{12}^{\{13425876\}}/\sqrt{8}$ |
| 13 | $W_{13}^{\{1\}}$ | $W_{13}^{\{12\}}/\sqrt{2}$ | $W_{13}^{\{124\}}/\sqrt{3}$ | $W_{13}^{\{1245\}}/2$ | $W_{13}^{\{12458\}}/\sqrt{5}$ | $W_{13}^{\{124586\}}/\sqrt{6}$ | $W_{13}^{\{1245863\}}/\sqrt{7}$ | $W_{13}^{\{12458637\}}/\sqrt{8}$ |
| 14 | $W_{14}^{\{1\}}$ | $W_{14}^{\{13\}}/\sqrt{2}$ | $W_{14}^{\{134\}}/\sqrt{3}$ | $W_{14}^{\{1345\}}/2$ | $W_{14}^{\{13456\}}/\sqrt{5}$ | $W_{14}^{\{134567\}}/\sqrt{6}$ | $W_{14}^{\{1345672\}}/\sqrt{7}$ | $W_{14}^{\{13456728\}}/\sqrt{8}$ |
| 15 | $W_{15}^{\{1\}}$ | $W_{15}^{\{12\}}/\sqrt{2}$ | $W_{15}^{\{123\}}/\sqrt{3}$ | $W_{15}^{\{1235\}}/2$ | $W_{15}^{\{12357\}}/\sqrt{5}$ | $W_{15}^{\{123574\}}/\sqrt{6}$ | $W_{15}^{\{1235746\}}/\sqrt{7}$ | $W_{15}^{\{12357468\}}/\sqrt{8}$ |

Embodiment 8

Figure 8:
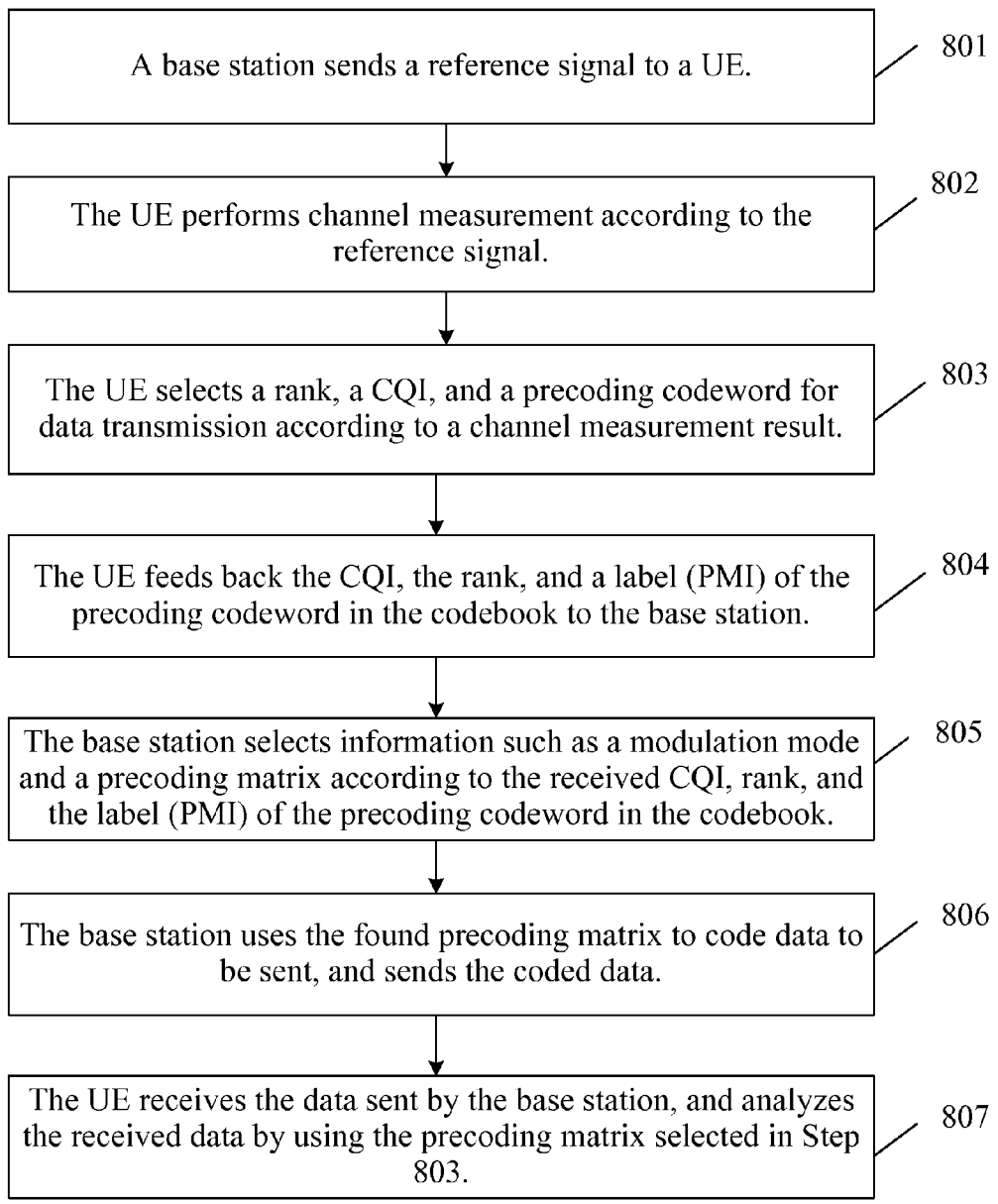
FIG. 8 is a flow chart of a method for data transmission according to Embodiment 8 of the present invention.

Embodiment 8 of the present invention provides a method for data transmission. Referring to FIG. 8, in this method, a codebook for eight-antenna is stored in a UE and a base station, and the codebook for eight-antenna in this method is obtained according to the technical solutions provided by Embodiments 1 to 7. The method specifically includes the following steps.

At block 801, the base station sends a reference signal to the UE.

At block 802, the UE performs channel measurement according to the reference signal.

At block 803, the UE selects a rank, a Channel Quality Indicator (CQI), and a precoding codeword for data transmission according to a channel measurement result, where the precoding codeword is a certain matrix selected from a preset codebook for eight-antenna, that is, a precoding codeword (the codeword for short) is selected.

At block 804, the UE feeds back the CQI, the rank, and a label (PMI) of the precoding codeword in the codebook to the base station.

At block 805, the base station selects information such as a modulation mode and a precoding matrix according to the received CQI, rank, and the label (PMI) of the precoding codeword in the codebook.

Specifically, the base station searches for the precoding matrix in the codebook for eight-antenna.

At block 806, the base station uses the found precoding matrix to code data to be sent, and sends the coded data.

At block 807, the UE receives data sent by the base station, and analyzes the received data by using the precoding matrix selected at block 803.

According to Embodiment 8 of the present invention, the precoding matrix stored in the UE and the base station is applicable to scenarios including dual-polarization strong correlation, dual-polarization weak correlation, single-polarization strong correlation, and single-polarization weak correlation, etc.

Embodiment 9

Embodiment 9 of the present invention provides a method for data transmission. Referring to FIG. 9, the method includes the following steps.

At block 901, receive a label of a codeword in a codebook for eight-antenna sent by a UE;

At block 902, search for the codeword identified by the label in the codebook for eight-antenna;

At block 903, code data to be sent by using the codeword, and send coded data.

The codebook for eight-antenna includes at least: a rank-8 codeword for eight-antenna. The rank-8 codeword for eight-antenna is generated by multiplying an inverse matrix of a rotation matrix for eight-antenna with an eight-dimensional matrix formed by rank-4 codewords for four-antenna, or generated by extending rank-4 codewords for eight-antenna, where the rank-4 codeword for eight-antenna is obtained according to codewords for four-antenna.

A main execution body of the above steps in the embodiment of the present invention may be a base station.

According to Embodiment 9 of the present invention, the rank-8 codeword for eight-antenna is generated according to the rotation matrix for eight-antenna and the rank-4 codeword for four-antenna, or generated by extending the rank-4 codeword for eight-antenna, in which the rank-4 codeword for eight-antenna is obtained according to the codeword for four-antenna. The rank-8 codeword for eight-antenna is applicable to scenarios including dual-polarization strong correlation, dual-polarization weak correlation, single-polarization strong correlation, and single-polarization weak correlation, etc.

Embodiment 10

Embodiment 10 of the present invention provides a method for data transmission. Referring to FIG. 10, the method includes the following steps.

At block 1001, select a codeword in a codebook for eight-antenna.

At block 1002, send a label of the codeword in the codebook for eight-antenna to a base station.

The eight-antenna codebook includes at least one rank-8 codeword for eight-antenna. The rank-8 codeword for eight-antenna is generated by multiplying an inverse matrix of a rotation matrix for eight-antenna with an eight-dimensional matrix formed by rank-4 codeword for four-antenna, or generated by extending rank-4 codeword for eight-antenna, where the rank-4 codeword for eight-antenna is obtained according to codewords for four-antenna.

The above steps in the embodiment of the present invention may be implemented by a UE.

According to Embodiment 10 of the present invention, the rank-8 codeword for eight-antenna is obtained according to the rotation matrix for eight-antenna and the rank-4 codeword four-antenna, or obtained by extending the rank-4 codeword for eight-antenna, in which the rank-4 codeword for eight-antenna is obtained according to the codeword for four-antenna. The rank-8 codeword for eight-antenna is applicable to scenarios including dual-polarization strong correlation, dual-polarization weak correlation, single-polarization strong correlation, and single-polarization weak correlation, etc.

Embodiment 11

Figure 11:
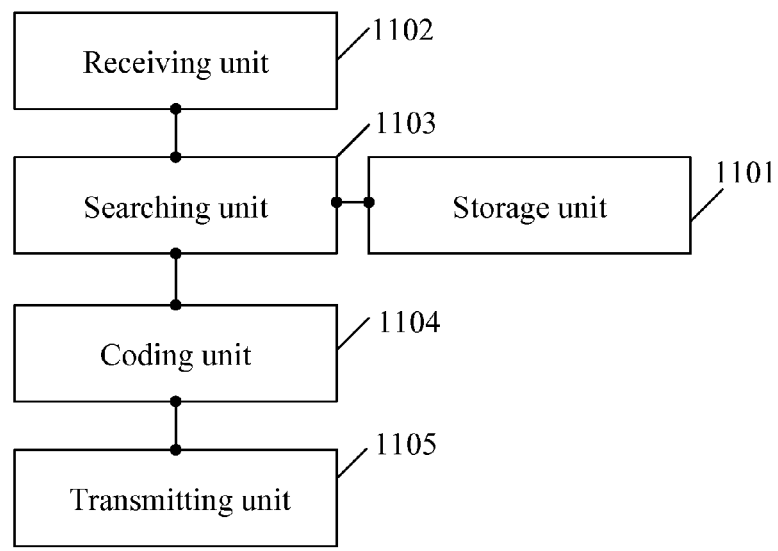
FIG. 11 is a structural view of a base station apparatus according to Embodiment 11 of the present invention.

Embodiment 11 of the present invention provides a base station apparatus. Referring to FIG. 11, the base station apparatus includes a storage unit 1101, a receiving unit 1102, a searching unit 1103, a coding unit 1104, and a transmitting unit 1105.

The storage unit 1101 is configured to store a codebook for eight-antenna. The eight-antenna codebook includes at least one rank-8 codeword for eight-antenna. The rank-8 codeword for eight-antenna is generated by multiplying an inverse matrix of a rotation matrix for eight-antenna with an eight-dimensional matrix formed by a rank-4 codeword for four-antenna, or generated by extending rank-4 codeword for eight-antennas, where the rank-4 codeword for eight-antenna is obtained according to a codeword for four-antenna.

The receiving unit 1102 is configured to receive a label of a codeword in a codebook for eight-antenna sent by a UE.

The searching unit 1103 is configured to search for the codeword identified by the label in the codebook for eight-antenna.

The coding unit 1104 is configured to code data to be sent by using the codeword found by the searching unit 1103.

The transmitting unit 1105 is configured to send the data coded by the coding unit 1104.

The rank-4 codeword for eight-antenna is obtained by multiplying the rank-4 codeword for four-antenna with a diagonal matrix, and concatenating the rank-4 codeword for four-antenna and a matrix obtained by multiplying the rank-4 codeword for four-antenna with the diagonal matrix; or, the rank-4 codeword for eight-antenna is obtained by multiplying a first rank-4 codeword for four-antenna with a diagonal matrix, and concatenating a matrix obtained by multiplying the first rank-4 codeword for four-antenna with the diagonal matrix and a second rank-4 codeword for four-antenna.

First four columns of the rank-8 codeword for eight-antenna are the rank-4 codeword for eight-antenna, and last four columns are obtained by getting negative values of first four rows or last four rows of the eight-antenna rank-4 codeword.

Alternatively, last four columns of the rank-8 codeword for eight-antenna are the rank-4 codeword for eight-antenna, and first four columns are obtained by getting negative values of first four rows or last four rows of the rank-4 codeword for eight-antenna.

According to Embodiment 11 of the present invention, the rank-8 codeword for eight-antenna is obtained according to a rotation matrix for eight-antenna and rank-4 codeword for four-antenna, or obtained by extending rank-4 codeword for eight-antenna, in which the rank-4 codeword for eight-antenna is obtained according to a codeword for four-antenna, thereby simplifying the complexity of the codebook design. The codeword for eight-antenna has a nested characteristic and a finite character set, which may decrease the computational complexity of a CQI and reduce the storage space of the base station. The codeword for eight-antenna is applicable to scenarios including dual-polarization strong correlation, dual-polarization weak correlation, single-polarization strong correlation, and single-polarization weak correlation.

Embodiment 12

Figure 12:
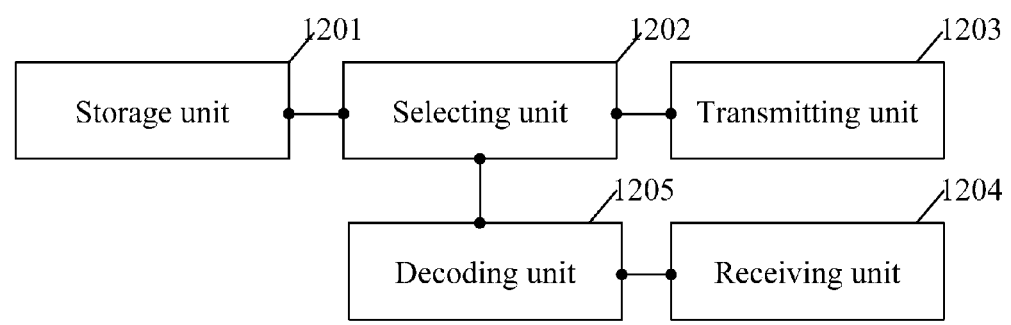
FIG. 12 is a structural view of a UE according to Embodiment 12 of the present invention.

Embodiment 12 of the present invention provides a UE. Referring to FIG. 12, the UE includes a storage unit 1201, a selecting unit 1202, and a transmitting unit 1203.

The storage unit 1201 is configured to store a codebook for eight-antenna. The codebook for eight-antenna includes at least one rank-8 codeword for eight-antenna. The rank-8 codeword for eight-antenna is obtained by multiplying an inverse matrix of a rotation matrix for eight-antenna with an eight-dimensional matrix formed by a rank-4 codeword for four-antenna; or obtained by extending rank-4 codewords for eight-antenna, where the rank-4 codeword for eight-antenna is obtained according to a codeword for four-antenna.

The selecting unit 1202 is configured to select a codeword in the codebook for eight-antenna.

The transmitting unit 1203 is configured to send a label of the selected codeword in the codebook for eight-antenna to a base station.

The UE further includes a receiving unit 1204, configured to receive data sent by the base station, where the data sent by the base station is sent after the base station uses the codeword identified by the label to code the data to be sent; and a decoding unit 1205, configured to decode the data sent by the base station according to the selected codeword.

The rank-4 codeword for eight-antenna is obtained by multiplying the rank-4 codeword for four-antenna with a diagonal matrix, and concatenating the rank-4 codeword for four-antenna and a matrix obtained by multiplying the rank-4 codeword for four-antenna with the diagonal matrix; or, the rank-4 codeword for eight-antenna is obtained by multiplying a first rank-4 codeword for four-antenna with a diagonal matrix, and concatenating a second rank-4 codeword for four-antenna and a matrix obtained by multiplying the first rank-4 codeword for four-antenna with the diagonal matrix.

First four columns of the rank-8 codeword for eight-antenna are a rank-4 codeword for eight-antenna, and last four columns are obtained by getting negative values of first four rows or last four rows of the rank-4 codeword for eight-antenna; alternatively, last four columns of the rank-8 codeword for eight-antenna are a rank-4 codeword for eight-antenna, and first four columns are obtained by getting negative values of first four rows or last four rows of the rank-4 codeword for eight-antenna.

According to Embodiment 12 of the present invention, the rank-8 codeword for eight-antenna is obtained according to the rotation matrix for eight-antenna and the rank-4 codeword for four-antenna; or obtained by extending the rank-4 codeword for eight-antenna, in which the rank-4 codeword for eight-antenna is obtained according to the codeword for four-antenna, thereby simplifying the complexity of the codebook design. The codeword for eight-antenna have a nested characteristic and a finite character set, which may decrease the computational complexity of a CQI and reduce the storage space of the UE. The codeword for eight-antenna is applicable to scenarios including dual-polarization strong correlation, dual-polarization weak correlation, single-polarization strong correlation, and single-polarization weak correlation, etc.

An embodiment of the present invention provides a base station apparatus, which includes a storage unit, a receiving unit, a searching unit, a coding unit, and a transmitting unit.

The storage unit is configured to store a codebook for eight-antenna. The codebook for eight-antenna includes at least one rank-8 codeword for eight-antenna. The rank-8 codeword for eight-antenna is generated by multiplying an inverse matrix of a rotation matrix for eight-antenna with an eight-dimensional matrix formed by rank-4 codewords for four-antenna; or obtained by extending rank-4 codewords for eight-antenna, where the rank-4 codeword for eight-antenna is obtained according to codeword for four-antenna.

The receiving unit is configured to receive a label of a codeword in the codebook for eight-antenna sent by a UE.

The searching unit is configured to search for the codeword identified by the label received by the receiving unit in the codebook for eight-antenna stored by the storage unit.

The coding unit is configured to code data to be sent by using the codeword found by the searching unit.

The transmitting unit is configured to send the data coded by the coding unit.

The storage unit is specifically configured to store the rank-4 codeword for eight-antenna obtained by concatenating the rank-4 codeword for four-antenna and a matrix obtained by multiplying the rank-4 codeword for four-antenna with a diagonal matrix, or specifically configured to store the rank-4 codeword for eight-antenna obtained by concatenating a second rank-4 codeword for four-antenna and a matrix obtained by multiplying a first rank-4 codeword for four-antenna with a diagonal matrix.

The storage unit is further configured to store the rank-8 codeword for eight-antenna obtained by using the rank-4 codeword for eight-antenna as first four columns of the rank-8 codeword for eight-antenna, and using negative values of first four rows or last four rows of the rank-4 codeword for eight-antenna as last four columns of the rank-8 codeword for eight-antenna; or specifically configured to store the rank-8 codeword for eight-antenna obtained by using the rank-4 codewords for eight-antenna as last four columns of the rank-8 codeword for eight-antenna, and using negative values of first four rows or last four rows of the rank-4 codeword for eight-antenna as first four columns of the rank-8 codeword for eight-antenna.

An embodiment of the present invention provides a UE, which includes a storage unit, a selecting unit, and a transmitting unit.

The storage unit is configured to store an eight-antenna codebook. The eight-antenna codebook includes at least one rank-8 codeword for eight-antenna. The rank-8 codeword for eight-antenna is generated by multiplying an inverse matrix of a rotation matrix for eight-antenna with an eight-dimensional matrix formed by rank-4 codewords for four-antenna, or generated by extending rank-4 codeword for eight-antennas, where the rank-4 codeword for eight-antenna is obtained according to a codeword for four-antenna.

The selecting unit is configured to select a codeword in the codebook for eight-antenna stored by the storage unit.

The transmitting unit is configured to send a label of the codeword selected by the selecting unit in the codebook for eight-antenna to a base station.

The storage unit is specifically configured to store the rank-4 codeword for eight-antenna obtained by concatenating the rank-4 codeword for four-antenna and a matrix obtained by multiplying the rank-4 codeword for four-antenna with a diagonal matrix, or specifically configured to store the rank-4 codeword for eight-antenna obtained by concatenating a second rank-4 codeword for four-antenna and a matrix obtained by multiplying a first rank-4 codeword for four-antenna with a diagonal matrix.

The storage unit is specifically configured to store the rank-8 codeword for eight-antenna obtained by using the rank-4 codeword for eight-antenna as first four columns of the rank-8 codeword for eight-antenna, and using negative values of first four rows or last four rows of the rank-4 codeword for eight-antenna as last four columns of the rank-8 codeword eight-antenna, or specifically configured to store the rank-8 codeword for eight-antenna obtained by using the rank-4 codeword for eight-antenna as last four columns of the rank-8 codeword for eight-antenna, and using negative values of first four rows or last four rows of the rank-4 codeword for eight-antenna as first four columns of the rank-8 codeword for eight-antenna.

An embodiment of the present invention provides a method for generating a codebook, which includes:

obtaining a rotation matrix $U_{rot}^{(8)}$ for eight-antenna;

obtaining rank-4 codewords for four-antenna; and obtaining a rank-8 codeword for eight-antenna by multiplying an inverse matrix of the rotation matrix with an eight-dimensional matrix formed by the rank-4 codewords for four-antenna, where the rank-8 codeword for eight-antenna are used by a base station for coding data to be sent.

A structure of the eight-dimensional matrix formed by the rank-4 codewords for four-antenna is $$\begin{bmatrix} X_p^{(4)} & 0 \\ 0 & X_q^{(4)} \end{bmatrix}, \text{ or } \begin{bmatrix} 0 & X_q^{(4)} \\ X_p^{(4)} & 0 \end{bmatrix}, \text{ or } \begin{bmatrix} X_p^{(4)} & 0 \\ 0 & X_p^{(4)} \end{bmatrix}, \text{ or } \begin{bmatrix} 0 & X_p^{(4)} \\ X_p^{(4)} & 0 \end{bmatrix},$$

where $X_q^{(4)}$ and $X_p^{(4)}$ are respectively the rank-4 codewords for four-antenna.

The method further includes:

switching rows of the obtained rank-8 codeword for eight-antenna.

An embodiment of the present invention further provides a method for generating a codebook, which includes:

obtaining a codeword for four-antenna; and obtaining a rank-1 codeword for eight-antenna or a rank-4 codeword for eight-antenna by using the codewords for four-antenna.

As for a scenario of single-polarization strong correlation, the obtaining the codewords for four-antenna includes:

obtaining a DFT based rank-1 codeword for four-antenna by using a formula $$D_{g,mn}^{(N_T)} = \exp\left(j\frac{2\pi}{N_T}m\left(n+\frac{g}{Q}\right)\right)/N_T, \text{ where } D_{g,mn}^{(N_T)}$$

is an element of an $m^{th}$ row and an $n^{th}$ column of a $g^{th}$ codeword among the DFT based rank-1 codewords for four transmit antennas, Q is the number of codewords optimized for a scenario of single-polarization strong correlation, and $N_T=4$; or obtaining the DFT based rank-1 codeword for eight-antenna $x_p^{(8)}$ by using a formula $$D_{g,mn}^{(N_T)} = \exp\left(j\frac{2\pi}{N_T}m\left(n+\frac{g}{Q}\right)\right)/N_T,$$

and selecting four elements in $x_p^{(8)}$ to be elements of the DFT based rank-1 codeword for four transmit antennas according to polarization groupings of antennas, where $D_{g,mn}^{(N_T)}$ is an element of the $m^{th}$ and the $n^{th}$ column of the $g^{th}$ codeword among the DFT based rank-1 codeword for eight-antenna, Q is the number of codewords optimized for a scenario of single-polarization strong correlation, and $N_T=8$.

The obtaining the codeword for four-antenna further includes:

extending the DFT based rank-1 codeword for four-antenna to obtain the rank-4 codeword for four-antenna according to Householder transformation; or extending the DFT based rank-1 codeword for four-antenna to obtain the rank-4 codeword for four-antenna by using a formula $M_p^{(4)}=e_p \times T$ and a constraint condition of $V_p^{(4)}=M_p(:,1)$, where $M_p^{(4)}$ represents the rank-4 codeword for four-antenna, $e_p$ is a diagonal matrix, T is a 4×4-dimensional Unitary matrix, and $v_p^{(4)}$ represents the DFT based rank-1 codeword for four-antenna.

The obtained codeword for four-antenna includes the DFT based rank-1 codeword for four-antenna $v_p^{(4)}$.

The obtaining the rank-1 codeword for eight-antenna by using the codeword for four-antenna includes:

obtaining the rank-1 codeword for eight-antenna by concatenating the DFT based rank-1 codeword for four-antenna $v_p^{(4)}$ and a matrix obtained by multiplying the DFT based rank-1 codeword for four-antenna $v_p^{(4)}$ with an optimized parameter $e^{j\Theta_p}$.

The obtained codeword for four-antenna includes the rank-4 codeword for four-antenna $M_r^{(4)}$. The obtaining the rank-1 codeword for eight-antenna according to the codeword for four-antenna includes:

multiplying a rotation matrix for four-antenna with a first column of $M_p^{(4)}$ to obtain a matrix having four rows and one column, multiplying the matrix having four rows and one column with an optimized parameter $e^{j\Theta_r}$, and concatenating a matrix obtained by multiplying the matrix having four rows and one column with the optimized parameter $e^{j\Theta_r}$ and the matrix having four rows and one column to obtain the rank-1 codeword for eight-antenna as for a scenario of dual-polarization strong correlation when the polarization groupings of antennas are {1, 2, 5, 6} and {3, 4, 7, 8}; and/or multiplying a rotation matrix for four-antenna with a first column of $M_r^{(4)}$ to obtain a first matrix, multiplying the rotation matrix for four-antenna with a first column of $M_{r+R/2}^{(4)}$ and the optimized parameter $e^{j\Theta_r}$ to obtain a second matrix if r is in a range of 1 to R/2, and concatenating the first matrix and the second matrix to obtain the rank-1 codeword for eight-antenna as for a scenario of dual-polarization strong correlation when the polarization groupings of antennas are {1, 2, 7, 8} and {3, 4, 5, 6}; or multiplying a rotation matrix four-antenna with a first column of $M_{r-R/2}^{(4)}$ and the optimized parameter $e^{j\Theta_r}$ to obtain a third matrix, concatenating the first matrix and the third matrix to obtain the rank-1 codeword for eight-antenna if r is in a range of (R/2)+1 to R; and/or multiplying a rotation matrix for four-antenna with a first column of $M_{r1}^{(4)}$ to obtain a fourth matrix, multiplying the rotation matrix for four-antenna with a first column of $M_{r2}^{(4)}$ and an optimized parameter $e^{j\Theta_r}$ to obtain a fifth matrix, and concatenating the fourth matrix and the fifth matrix to obtain the rank-1 codeword for eight-antenna as for a scenario of dual-polarization weak correlation.

The obtained codeword for four-antenna includes the rank-4 codeword for four-antenna. The obtaining the rank-4 codeword for eight-antenna according to the codeword for four-antenna includes:

multiplying the rank-4 codeword for four-antenna with a diagonal matrix, and concatenating a matrix obtained by multiplying the rank-4 codeword for four-antenna with the diagonal matrix and the rank-4 codeword for four-antenna to obtain the rank-4 codeword for eight-antenna; and/or multiplying a first rank-4 codeword for four-antenna with a diagonal matrix, and concatenating a second rank-4 codeword for four-antenna and a matrix obtained by multiplying the first rank-4 codeword for four-antenna with the diagonal matrix to obtain the rank-4 codeword for eight-antenna.

The method further includes:

using the rank-4 codeword for eight-antenna as first four columns of the rank-8 codeword for eight-antenna, and using negative values of first four rows or last four rows of the rank-4 codeword for eight-antenna as last four columns of the rank-8 codeword for eight-antenna; or using the rank-4 codeword for eight-antenna as last four columns of the rank-8 codeword for eight-antenna, and using negative values of first four rows or last four rows of the rank-4 codeword for eight-antenna as first four columns of the rank-8 codeword for eight-antenna.

All or a part of the steps of the method according to the embodiments of the present invention may be implemented by a program instructing relevant hardware. The program may be stored in a computer readable storage medium, such as a ROM, a magnetic disk, or an optical disk.

The method for generating a codebook and the method and apparatus for data transmission of the embodiments of the present invention are described in detail above. The principle and implementation of the present invention are described herein through specific examples. The description about the embodiments of the present invention is merely provided for ease of understanding of the method and core ideas of the present invention. Variations and modifications may be made to the present invention in terms of the specific implementations and application scopes according to the ideas of the present invention. Therefore, the specification shall not be construed as a limit to the present invention.

It should be noted that, in the above embodiments of the UE and the base station, the units are divided according to functional logic, but are not limited to the above division as long as they can implement corresponding functions. In addition, the specific name of each functional unit is used for distinguishing, instead of limiting the protection scope of the present invention.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A base station apparatus, comprising
    a storage unit configured to store a codebook for an eight-antenna configuration, the codebook for the eight-antenna configuration comprising at least one rank-8 codeword for the eight-antenna configuration, the rank-8 codeword for the eight-antenna configuration being generated by extending rank-4 codewords for the eight-antenna configuration;
    a receiver configured to receive a label of a codeword from a user equipment (UE);
    a searching unit configured to select the codeword identified by the label from the codebook for the eight-antenna configuration;
    a coding unit configured to code data to be sent using the codeword selected by the searching unit; and
    a transmitter configured to send the coded data,
    wherein each rank-4 codeword for the eight-antenna configuration is generated by creating a matrix by multiplying the rank-4 codeword for a four-antenna configuration with a diagonal matrix and concatenating the rank-4 codeword for the four-antenna configuration and the matrix.

2. The base station apparatus according to claim 1, wherein the rank-8 codeword for the eight-antenna configuration is generated by forming a first four columns of the rank-8 codeword for the eight-antenna configuration with a first rank-4 codeword for the eight-antenna configuration and forming a remaining four columns of the rank-8 codeword for the eight-antenna configuration with a second rank-4 codeword for the eight-antenna configuration.

3. The base station apparatus according to claim 1, wherein the rank-8 codeword for the eight-antenna configuration is generated by forming a first four columns of the rank-8 codeword for the eight-antenna configuration with the rank-4 codeword for the eight-antenna configuration, and forming a remaining four columns with a negative value of the rank-four codeword for the eight-antenna configuration.

4. A base station apparatus, comprising
    a storage unit configured to store a codebook for an eight-antenna configuration, the codebook for the eight-antenna configuration comprising at least one rank-8 codeword for the eight-antenna configuration, the rank-8 codeword for the eight-antenna configuration being generated by extending rank-4 codewords for the eight-antenna configuration;
    a receiver configured to receive a label of a codeword from a user equipment (UE);
    a searching unit configured to select the codeword identified by the label from the codebook for the eight-antenna configuration;
    a coding unit configured to code data to be sent using the codeword selected by the searching unit; and
    a transmitter configured to send the coded data,
    wherein each rank-4 codeword for the eight-antenna configuration is generated by creating a matrix by multiplying the rank-4 codeword for a four-antenna configuration with a diagonal matrix and concatenating a second rank-4 codeword for the four-antenna configuration and the matrix.

5. The base station apparatus according to claim 4, wherein the rank-8 codeword for the eight-antenna configuration is generated by forming a first four columns of the rank-8 codeword for the eight-antenna configuration with a first rank-4 codeword for the eight-antenna configuration and forming a remaining four columns of the rank-8 codeword for the eight-antenna configuration with a second rank-4 codeword for the eight-antenna configuration.

6. The base station apparatus according to claim 4, wherein the rank-8 codeword for the eight-antenna configuration is generated by forming a first four columns of the rank-8 codeword for the eight-antenna configuration with the rank-4 codeword for the eight-antenna configuration, and forming a remaining four columns with a negative value of the rank-four codeword for the eight-antenna configuration.

7. An apparatus for generating a codebook in a communication system, comprises:
    a storage unit, configured to store instructions for generating a codebook, the codebook comprises at least one rank-8 codeword for an eight-antenna configuration, the rank-8 codeword for the eight-antenna configuration being generated by extending a rank-4 codeword for the eight-antenna configuration, wherein the rank-4 codeword for the eight-antenna configuration is generated by creating a matrix by multiplying a rank-4 codeword for a four-antenna configuration with a diagonal matrix, and concatenating the rank-4 codeword for the four-antenna configuration and the matrix; and
    a processor coupled to the storage unit, configured to execute the instructions retained in the storage unit.

8. The apparatus according to claim 7, wherein the rank-8 codeword for the eight-antenna configuration is generated by forming a first four columns of the rank-8 codeword for the eight-antenna configuration with a first rank-4 codeword for the eight-antenna configuration, and forming a remaining four columns with a second rank-4 codeword for the eight-antenna configuration.

9. The apparatus according to claim 7, wherein the rank-8 codeword for the eight-antenna configuration is generated by forming a first four columns of the rank-8 codeword for the eight-antenna configuration with the rank-4 codeword for the eight-antenna configuration, and forming a remaining four columns with a negative value of the rank-4 codeword for the eight antenna configuration.

10. An apparatus for generating a codebook in a communication system, comprises:
   a storage unit, configured to store instructions for generating a codebook, the codebook comprises at least one rank-8 codeword for an eight-antenna configuration, the rank-8 codeword for the eight-antenna configuration being generated by extending a rank-4 codeword for the eight-antenna configuration, wherein, the rank-4 codeword for the eight-antenna configuration is generated by creating a matrix by multiplying a rank-4 codeword for a four-antenna configuration (the four antenna) with a diagonal matrix, and concatenating a second rank-4 codeword for the four-antenna configuration and the matrix; and
   a processor coupled to the storage unit, configured to execute the instructions retained in the storage unit.

11. The apparatus according to claim 10, wherein the rank-8 codeword for the eight-antenna configuration is generated by forming a first four columns of the rank-8 codeword for the eight-antenna configuration with a first rank-4 codeword for the eight-antenna configuration, and forming a remaining four columns with a second rank-4 codeword for the eight-antenna configuration.

12. The apparatus according to claim 10, wherein the rank-8 codeword for the eight-antenna configuration is generated by forming a first four columns of the rank-8 codeword for the eight-antenna configuration with the rank-4 codeword for the eight-antenna configuration, and forming a remaining four columns with a negative value of the rank-4 codeword for the eight antenna configuration.

* * * * *